(12) United States Patent
Di Bella

(10) Patent No.: US 9,498,725 B2
(45) Date of Patent: Nov. 22, 2016

(54) METHOD AND APPARATUS TO PLAY CARDS

(76) Inventor: Antonio Di Bella, Aci Castello (IT)

( * ) Notice: Subject to any disclaimer, the term of this patent is extended or adjusted under 35 U.S.C. 154(b) by 580 days.

(21) Appl. No.: 13/993,071

(22) PCT Filed: Dec. 13, 2011

(86) PCT No.: PCT/IB2011/055648
§ 371 (c)(1),
(2), (4) Date: Jun. 10, 2013

(87) PCT Pub. No.: WO2012/080954
PCT Pub. Date: Jun. 21, 2012

(65) Prior Publication Data
US 2013/0267288 A1    Oct. 10, 2013

(30) Foreign Application Priority Data

Dec. 13, 2010 (IT) .............................. PD2010A0376

(51) Int. Cl.
*G06F 17/00* (2006.01)
*G06F 19/00* (2011.01)
(Continued)

(52) U.S. Cl.
CPC ............... *A63F 13/80* (2014.09); *G07F 17/32* (2013.01); *G07F 17/326* (2013.01);
(Continued)

(58) Field of Classification Search
CPC .................... G07F 17/3225; G07F 17/3293
See application file for complete search history.

(56) References Cited

U.S. PATENT DOCUMENTS

2011/0218023 A1* 9/2011 Hall ..................... G07F 17/3293
463/13
2012/0289299 A1* 11/2012 Stevens ............... G07F 17/3293
463/13

FOREIGN PATENT DOCUMENTS

EP          1563881 A1    8/2005
WO      2007034216 A1    3/2007

OTHER PUBLICATIONS

ISR and Written Opinion in application PCT/IB2011/055648.

* cited by examiner

*Primary Examiner* — Steven J Hylinski
(74) *Attorney, Agent, or Firm* — Kristina Castellano; Castellano PLLC

(57) ABSTRACT

The present invention relates to a method for controlling a network (100) of equipment (10a, 10b, 11) for the game of cards. The network includes a server for controlling the game (10b, 11) and at least one piece of playing equipment (10a), the server and the piece of playing equipment being able to communicate data between them, each piece of playing equipment (10a) including display means (20). The method comprises the steps of: identifying a portion (R) of the totality (T) of the playing cards which is able to be displayed on the display means (20), the portion (R) of cards displayed being the same in all the pieces of playing equipment (10a); determining the number of cards assigned (Q) to each player using a piece of playing equipment (10a) in order to play a hand at the game of cards; generating at the side of the server (10b, 11) a vector vetcar having a dimension which is equal to or greater than the total number of cards (T), there being associated with each a element vetcar(i) of the vector a card of the totality of cards (T); generating a plurality of elements in a number equal to the (Continued)

portion (R) of cards and subdividing the plurality of elements into a plurality of m subgroups sottogrup, each of those elements in each subgroup being unambiguously identified by at least one alphanumeric character; displaying on the display means (20) in each piece of playing equipment the elements subdivided into the subgroups; selecting in the piece of playing equipment (10*a*) in a first selection an element from the n forming a subgroup of the plurality and sending to the server (10*b*) a piece of data representing the alphanumeric character identifying the element or alternatively generating in the server (10*b*, 11) an alphanumeric character which unambiguously determines an element in one of the subgroups and sending a piece of data representing the alphanumeric character to the piece of playing equipment so as to select an element from a subgroup of the plurality; sending the vector vetcar from the server (10*b*) to all the pieces of playing equipment (10*a*) present in the network (100); associating with each element of the subgroups a card of the vector vetcar, the same card is associated with the same element identified by the same alphanumeric character in each piece of playing equipment (10*a*); the element selected in the first selection being associated with a card which forms part of the cards (Q) in the possession of the player in a hand of the game.

11 Claims, 15 Drawing Sheets

(51) Int. Cl.
    *A63F 13/80*     (2014.01)
    *G07F 17/32*     (2006.01)
(52) U.S. Cl.
    CPC ....... *G07F 17/3225* (2013.01); *G07F 17/3272* (2013.01); *A63F 2300/534* (2013.01); *A63F 2300/5533* (2013.01); *A63F 2300/5586* (2013.01); *G07F 17/3293* (2013.01)

METHOD AND APPARATUS TO PLAY CARDS

CLAIM FOR PRIORITY

This application is a U.S. National Stage Application of PCT/IB2011/055648 filed on Dec. 13, 2011, which claims priority to Italian patent application PD2010A000376 filed on Dec. 13, 2010, the contents of both of which are incorporated herein by reference.

The present invention relates to a method for controlling equipment for the game of cards and equipment for the game of cards comprising a video display or a device for a game of the virtual type. The present invention allows the game of cards, such as the game of poker, to be played by a great plurality of players simultaneously ensuring a relatively low exchange of data between control servers and local computers of the individual players as well as a high level of security and transparency of the various steps of the game itself.

Poker is a family of card games, of which different variants exist which are referred to as specialities and the winner of which is determined by comparing the combinations formed with the cards of each player as well as a mechanism of successive bets. The object of the game is to win the "prize" which is achieved by collecting the different bets each time in respect of the different players. Generally, in each speciality each player receives a given number of cards, for example, five cards all covered during traditional poker, and it is possible to change one or more cards one or more times. There are specialities which also include one or more uncovered cards or one or more common cards by means of which the individual combinations can be composed. The traditional pack of cards comprises 52 cards and therefore the fact that each player has a number of "personal" cards constitutes a limit on the maximum number of players who can take part in the same poker game played having the same prize. However, this maximum number of players limits the maximum amount of the prize, which amount—if particularly high—attracts the players.

In recent years, the game of cards online has become substantially more widespread, for example online poker, or poker played over the Internet. Various studies lead to the conclusion that the spread of the online form of the game has been in large part the cause of the enormous increase in the number of poker players in the whole world. In the game of poker online, as in all games of cards played online, there is a continuous exchange of information between a computer server for the game and the computers of the various players connected to each other by means of an Internet Service Provider and an Internet Protocol network. The gaming server and the computers of the various players require a continuous exchange of messages which, therefore, for example, in the case of a large number of players, involves a large exchange of data and therefore a slowing of the game itself. Furthermore, the fact that lower levels of data are exchanged means a lower level of the possibility of errors. The fact of fewer data also means less space is required for the archiving thereof because all those data relating to the game of cards, in some cases also owing to the provisions themselves of the country in which the game is being played, have to be saved and stored for many years.

With the methods according to the prior art, for example, the initial sequence of the cards of the pack in games of only 10 players has to be saved and is already a substantial mass of data; in fact, 10 is the normal number of players for a game. Furthermore, still according to the prior art, the change of cards of the players must occur one at a time and in the due sequence because the quantity of cards changed by each player influences the cards which will go to the subsequent player. This type of game therefore imposes a significant succession of exchanges of data between the client and card distribution server itself owing to the interdependence thereof. It is further known in the field of card games, with particular attention to the online game, particularly when the number of players is particularly high, that security, that is to say, in particular the transparency and security during playing operations in protection of the player, is/are particularly desirable. In addition, as set out above, there are legislative provisions in some countries by which such protection is imposed by law on all providers of the possibility of playing, which providers will be referred to below as public gaming agents.

The real problem which is most common is the one in the sector known as "collusion", that is to say, when two or more persons collaborate in order to obtain an advantage over opponents at a card gaming table, particularly if it is virtual: this system makes use of the anonymity and the non-traceability of the user online. The most common form of collusion is "signalling".

As a first example, in the case of "signalling", this type of collusion is carried out with the exchange of information between accomplices, which exchange is at the root of all the other techniques set out below. If, for example, a poker game is being played with a hand with the intention of collecting the suit of diamonds and the player has an accomplice who communicates that he has two cards of diamonds, the player is thereby in a position to know that his probabilities of achieving the suit are reduced, therefore being able to choose to abandon the hand.

This practice is naturally applied to all the hands and affords an advantage of knowledge to the accomplices who can thereby better determine the probabilities of winning.

In order to set out more generally various collusion techniques, for example, it is possible to refer to the following website:
http://www.italiapokerclub.com/poker-news/6364/collusion-imbrogli-e-trucchi-nel-poker-online/

An object of the present invention is to solve these problems and other problems with reference to the prior art cited.

This problem is solved and this object is achieved by the present invention by means of a piece of equipment and a method carried out in accordance with the appended claims.

The features and advantages of the invention will be appreciated more clearly from the detailed description of a preferred embodiment thereof, illustrated by way of non-limiting example with reference to the appended drawings, in which.

Figure 1:
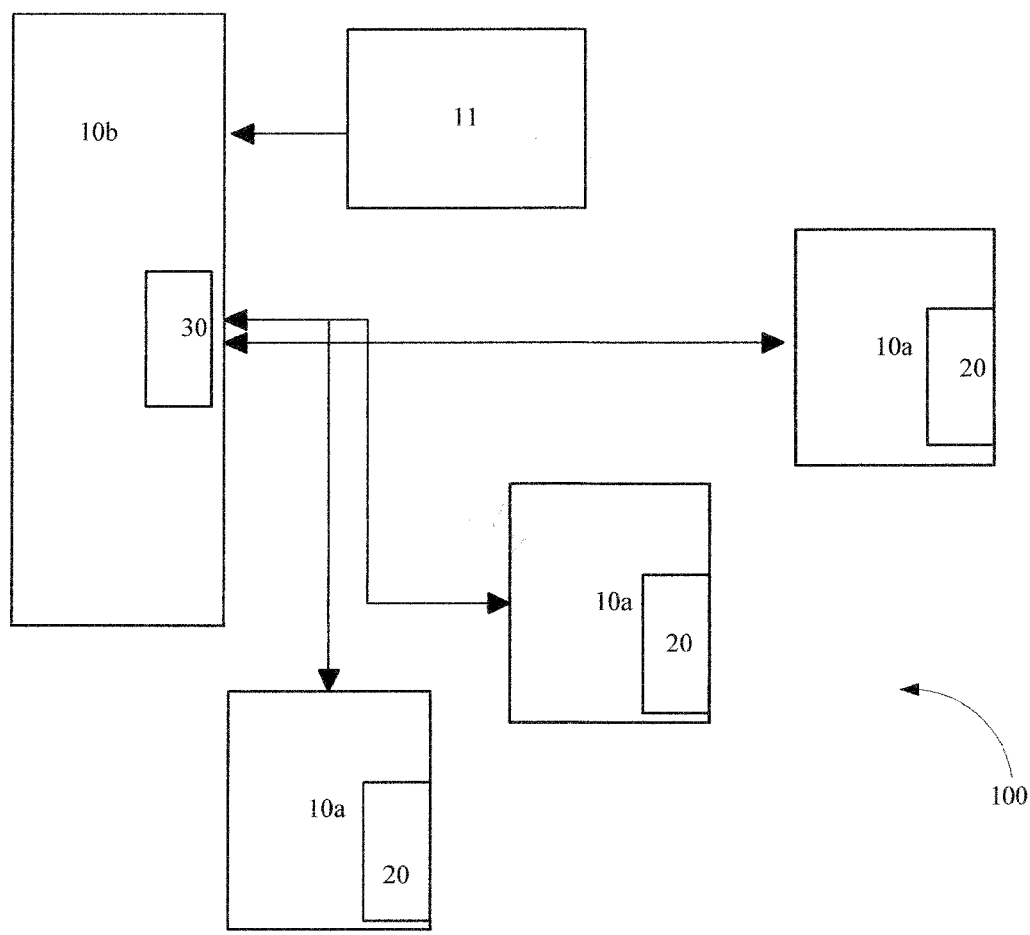
FIG. 1 is a simplified view of a network of pieces of equipment constructed in accordance with the present invention.
Figure 2:
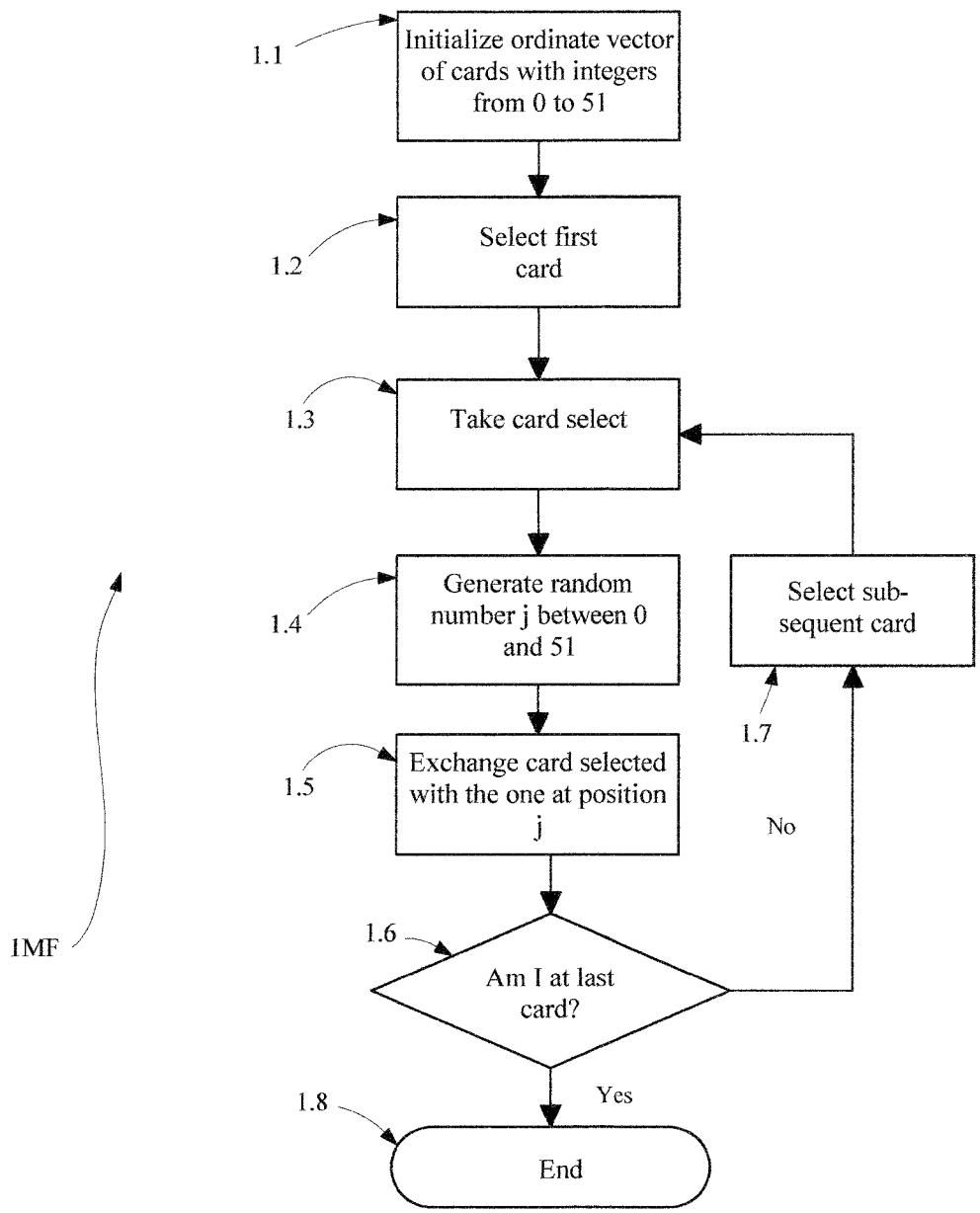
FIG. 2 is a flow chart showing a macrophase of the method according to the invention.

With reference at first to FIG. 1, there is generally designated 100 an equipment network 10a, 10b for the game of cards. The present description is given with special reference to the game of poker but the present invention may be used with obvious adaptations in any type of card game which provides for a plurality of players.

The various pieces of equipment 10a, 10b are connected to each other, for example, by means of an Internet Service Provider using an internet protocol such as the World Wide Web, but other types of protocol can be used. The various pieces of equipment may include a gaming server 10b and one or more pieces of playing equipment 10a, each piece of playing equipment 10a and server 10b being capable of exchanging messages with each other as set out in detail below. Although three pieces of playing equipment 10a are illustrated in FIG. 1, it should be understood that an arbitrary number of pieces of equipment can be connected to each other. In particular, the network 100 is preferably able to connect a high number of players to each other, even tens of thousands of players (therefore tens of thousands of pieces of equipment 10a) in such a manner that they simultaneously play the same hand of poker. Furthermore, although the various pieces of equipment/servers 10a, 10b are connected in FIG. 1 in a wireless manner, a connection via cables is also provided for in the present invention.

From the point of view of hardware, the pieces of playing equipment 10a may comprise any type of computer or processing device including any type of operating system such as, for example, Windows or Linux. The gaming server 10b may be any type of processing platform such as a Windows Server. It may also include other functions, for example, the function of being an HTML web page server. The piece of playing equipment 10a and server 10b may be equated to a multi-modal platform for the game of cards; a platform in the sense that they control the assignment of cards to a plurality of players; multi-modal because it can be used for playing a plurality of games of cards, with obvious adaptations in accordance with the type of game.

Software which allows cards to be played is installed in each piece of playing equipment 10a, in this preferred example poker, and preferably allows communication with a router 30 located inside the gaming server 10b, in particular when a player from a piece of playing equipment 10a wishes to establish a connection with the gaming server 10b, it sends a message to the router 30 in a manner known in the art. Communication between the server 10b and the pieces of equipment 10a is considered to be known in the reference technical field. A second server 11 in communication with the server 10b may optionally be present and is described in greater detail below.

Each piece of playing equipment 10a comprises display means, such as a monitor 20, for displaying the playing cards being used for the game of poker, in the manner set out in detail below.

The game of cards uses a number T of cards. Furthermore, each player uses, in order to play the game, a number Q of cards, where Q is a subset of T. Each player uses the same number Q of cards (all the players have the same number of cards in their possession equal to Q).

Generally, the number of cards T used in the game of poker corresponds to T=52 but the present invention is applicable to a game of cards including any number of playing cards. Furthermore, the present invention is applicable to various card games, in particular any specialities of poker, be it community card poker, draw poker or stud poker, and is therefore applicable to any number of cards Q in the possession of each player for a hand of poker.

In accordance with the type of game, in accordance with the type of speciality and in accordance with the number of cards used, all or only some R of the total of the playing cards T is/are displayed on each monitor 20. The portion of the cards R (or the entirety) displayed on each monitor 20 is always the same; the arrangement of the cards displayed (that is to say, how they are arranged on the screen) may vary, or how they are displayed (for example, the colours change, the dimensions change, etc.) from piece of playing equipment 10a to piece of playing equipment 10a but the R cards displayed are the same in each piece of playing equipment 10a and similarly "the sequence" thereof, as will be set out in detail below. Afterwards, therefore, the cards R will be the playing cards, that is to say, the players will be able to play only with the R cards which are displayed. However, it should be borne in mind that, between one hand and another, a different subset of cards T may be selected (that is to say, the R cards between different hands may be different).

From the R cards displayed, there are selected the Q cards which will be assigned to each player. Q are the cards which each player possesses in order to play a hand of cards, which may include the common cards (present in some poker hands) and also the so-called "personal" cards of each player. The fact that the cards belonging to a player may be selected only from the cards displayed R creates the security that, for each hand of the game, each player may know the cards from which each opponent may have his combination of cards, as will be set out in greater detail below. For example, in the case of draw poker, in which each player has Q=5 personal cards, all covered, the monitor displays all the playing cards T (therefore R=T) from which the Q cards will be selected for each player in the manner described below. In the case of community card poker, however, in which the cards Q of each player are given from the total of common cards and the covered personal cards; the remaining personal cards of each player are selected from the remaining cards (R−common cards) so as to form the group of Q cards thereof. More preferably, the monitor always displays all the playing cards T (T=R) for any card game.

According to an aspect of the invention, so as to be able to eliminate collusion involving signalling and the other techniques dependent thereon and to make the number of players extremely high and far greater than the standard number of players which would be obtained with a maximum number of cards equal to T (only 52, the standard pack from which the joker cards have been removed) if each of them were assigned only to one player (therefore, there would be a maximum of T/Q players), the players can divide between them some cards, that is to say, all the cards Q or at least a portion of the cards Q assigned to each player in a hand are selected from the cards displayed on the monitor 20 and two or more, or an arbitrary number, of players can share the same card, or a plurality of cards, as a personal card(s). These cards which two or more players can have in common will not be confused with the "common" cards present in some card disciplines, for example, in some disciplines of poker: the common cards are cards which all the players of a given hand have in common and it is known to all the players that those cards are part of the Q personal cards of each player whilst, in the present invention, there may be some cards which in a random manner can be common to one or more players—there is further the possibility that a card is common to all the players even if that event has a very low probability—but this is an event which is precisely probable and not certain and, therefore, it is not known to a given player which card is common to other players and with how many players, whilst, in the case of the common cards, it is known to all the players that those cards constitute part of the Q personal cards of each player. More preferably, however, the combinations in which two players in the same hand have Q identical cards will be excluded. The players are certain of the transparency of the operation carried out: according to a preferred aspect of the invention, the cards assigned to each player which are not the common cards may be selected only from the cards R which are visible in the monitor 20. In fact, with reference to the example described in the analysis of signalling in which poker has been played with a hand with the intention of collecting the suit of diamonds and the player has an accomplice who communicates that he has two cards of diamonds, without this feature of the invention the player is thereby capable of knowing that his probabilities of achieving the suit are reduced, being able to therefore choose to abandon the hand, whilst according to the invention the fact that a player has at least two cards of diamonds does not change his possibilities of again having diamond cards. The selection of the personal cards of each player may be carried out only from those R cards and two players can have some of the Q cards in common. In that manner, the number of players may be particularly high because the number of cards which can be assigned is far greater than the conventional T cards and therefore the number of players is far greater than T/Q; furthermore, the same personal cards as seen can be shared by a plurality of players and therefore the advantage which would be obtained with signalling is eliminated, as set out above.

In order to carry out the selection from the T cards of the Q cards for each player using the piece of equipment 10a according to the method of the invention and in order to carry out the hands of the game with one or more optional changes of cards, there is used the following procedure, with reference to the subsequent appended FIGS. 2 to 15.

The subsequent steps of the invention, as will be set out in greater detail below, are not necessarily carried out in the order in which they are described, the order described is only a preferred embodiment of the invention but in other embodiments some steps may be transposed relative to each other or moved.

First, there is initially generated a vector which is referred to below as "vetcar", with each element of which there is associated a card of the pack of cards, that is to say, the vector vetcar has a dimension T where T is equal to the total T of the playing cards used and each element vetcar(i)=playing card, and that pack is "shuffled". That macrophase 1MF for generating and shuffling may be carried out by means of, for example, the steps of the flow chart of FIG. 2.

In fact, an ordinate vector (otherwise known as a unidimensional array) is initially generated and has dimensions equal to T (in order, therefore, to obtain T cards), for example, from 0 to T−1 (if T=52, the standard 52 cards are obtained) of the vetcar type (0, 1, . . . T−1), and a card is associated with each element of the vector, vetcar(h)="card of the pack", with h being an integer and h=0, 1, . . . T−1, for example, simply starting from the two of the first suit=vetcar (0) and ending with the ace thereof=vetcar(12) and proceeding with the two of the subsequent suit=vetcar(13), that is to say, each card of the pack used may be identified with a number h from 0 to 51, in accordance with the step 1.1, that is to say, Vetsemi=[hearts, diamonds, clubs, spades]
for i={0, 1, 2, 3} therefore vetsemi(0)=hearts . . . vetsemi (3)=spades with j=i*13
vetcar (j)=card of value "2" of the suit vetsemi(i)
vetcar (j+12)=card of value "Ace" of the suit vetsemi(i).

It is naturally possible to start from any card (not only from the card having a value of two) and to use the chart as set out above. There is selected from that vector the first card following the order in which the cards are arranged along the vector (step 1.2).

The ordinate vector vetcar is now subjected to processing (step 1.3); until now, the cards are arranged from the 2 to the ace for each suit in a stable order whilst, in order to play a hand of cards, it is necessary for the cards to be shuffled: to that end, there is generated a casual number (that is to say, a random number), identified as j and included between 0 and T−1 (step 1.4). The random generation is carried out by means of a standard subroutine for generating random numbers which is standardized in this case so as to generate numbers between 0 and T−1. The first card selected vetcar (h) is therefore replaced with the card vetcar(j) where j is the random number, in particular the cards selected initially in position h and the card identified in the vector with the number j are exchanged for each other (step 1.5) inside the vector vetcar(h)⇔vetcar(j). It is then verified that the initial card selected is not the last card of the vector (step 1.6); if this is not the case, the subsequent card in the vector with respect to the first is selected (step 1.7)(h=h+1) and then the operations from 1.3 to 1.6 are repeated until the last card present in the ordinate vector is reached and, at that point, the first macrophase of the invention is terminated (step 1.8). In that manner, the cards have been shuffled and a new vector vetcar(h), in which the T cards of the pack are arranged in a random manner, is generated from the ordinate vector referred to as the above-mentioned "card vector" vetcar(h) with h=from 0 to T−1.

Therefore, the playing cards are represented by a vector vetcar, initially a vector having a whole index h with which a card is associated with each value vetcar(h), wherein those cards are positioned in a random manner.

In the event that not all the T cards are displayed but only a portion R thereof, the vector vetcar is constructed in a similar manner to the macrophase 1MF described above, but not all the T cards are included but instead only those R cards which it has been decided to display on the monitor 20.

For each hand of the game, the vector vetcar(h) is mixed up by carrying out the macrophase 1MF without generating the initial ordinate vector but simply by repeating the steps from 1.2 to 1.8 described above.

The subsequent macrophase (second macrophase 2MF) of the invention will now be set out, in which all the cards T generated above or only a portion R thereof are displayed on the monitor 20 of the piece of playing equipment 10b.

The cards, which will be displayed on the monitor 20 and from which the personal cards which are assigned to the various players (therefore not the common cards) will subsequently be selected, are associated with m subgroups. In detail, given a known number of cards (R or T) which it is desirable to display, there are generated m subgroups which can be identified as vectors each having a given index—generally a whole number—which can each contain the same number of elements and therefore the same number of cards (for example, n, the number of cards n is defined as the dimension of the subgroup) or can each be composed of a different number of elements (cards). The total of all the elements of all the subgroups gives the total number of cards displayed on the monitor. Some elements and therefore cards (q in number) as set out may also be excluded from the subdivision into m groups, and for reasons of transparency it is preferable that those q excluded cards also be visible to the players so that they know the cards from which it is possible to select cards for each player. In other words, even if the cards from which the cards of the players will be selected and therefore used in the game hand are the cards R, it is preferable also to display the remaining cards qtali for which T=R+q.

Each subgroup m of n elements, identifiable with a vector, is displayed on the monitor 20 of each piece of equipment 10a. In that first step, no card is yet associated with the various elements of each subgroup; it is only known that there are present m subgroups each having n elements. Preferably but not necessarily, the excluded elements q are also displayed on the monitor 20 in the sense that there is displayed on the monitor the fact that there are q excluded elements (=cards, two in number in the preferred example set out) and therefore q cards which cannot be selected during the distribution of the cards to each individual player. Each subgroup is further subsequently associated with a portion of the vector "card vector" vetcar which is generated during the macrophase 1MF described above. Therefore, the first display on the monitor 20 relates to the subdivision into subgroups and the number of elements for each subgroup without any reference to the playing cards.

As mentioned, in a preferred embodiment each subgroup may be identified as an ordinate vector (unidimensional array) sottogrup(t) where t is a whole number from 0 to n−1, n being the dimension of the subgroup equal to the dimension of the vector sottogrup, and n being able to be different in accordance with the subgroup (that is to say, the subgroups sottogrup(i=1 . . . n) and sottogrup(j=1 . . . l) may have n different from l). Initially, therefore, each cell of the array sottogrup(t) is simply an "empty cell", that is to say, the various elements sottogrup(t) are arbitrary elements, the content of which cells is not relevant, wherein, in a subsequent step, for each value of t, sottogrup(t)=a card belonging to the group of R cards. In greater detail, there are m subgroups or sottogrup, with i being from 1 to m and each subgroup has a dimension n (with n which may vary), that is to say, sottogrup$_{i=1 \ldots m}$(j=1 . . . n). Merely by way of example, the various subgroups (subsequently identified as cards) may be organized in a matrix Ma(i,j) having m rows and n columns (the term row and column is purely indicative and, in accordance with the display, the two terms may be inverted with respect to each other), in which each row (or each column in accordance with the method in which the matrix is displayed) represents a subgroup. In that case of an arrangement in accordance with a matrix, it is obvious that the various subgroups all have to have the same dimension.

Supposing that the card game which is being played is the game of poker, more particularly of the draw poker type, in which all the cards Q assigned to each player are selected in the manner described below from those displayed (there are no common cards), and in the case in which there are T=52 standard cards, and it is desirable to display all the cards R=T, a matrix is formed having 5 rows and 10 columns (m=5 subgroups from n=10 cards each), from which it may be derived that q=2 cards are excluded (cards "off the table") from the matrix and therefore cannot be selected to form part of the Q cards of any player. The matrix Ma(i,j) m×n is intended to refer to one of the various possible methods of dividing the total number T of cards into m groups, a number of other possibilities are present and included in the method of the present invention. A simple variant may be considered to be a matrix of n rows and m columns. Furthermore, each group m may contain a different number of cards, for which a different method of displaying the various playing cards is a series of m rows or columns of cards (for example, one above/beside the other) each including a different number of cards.

Figure 15:
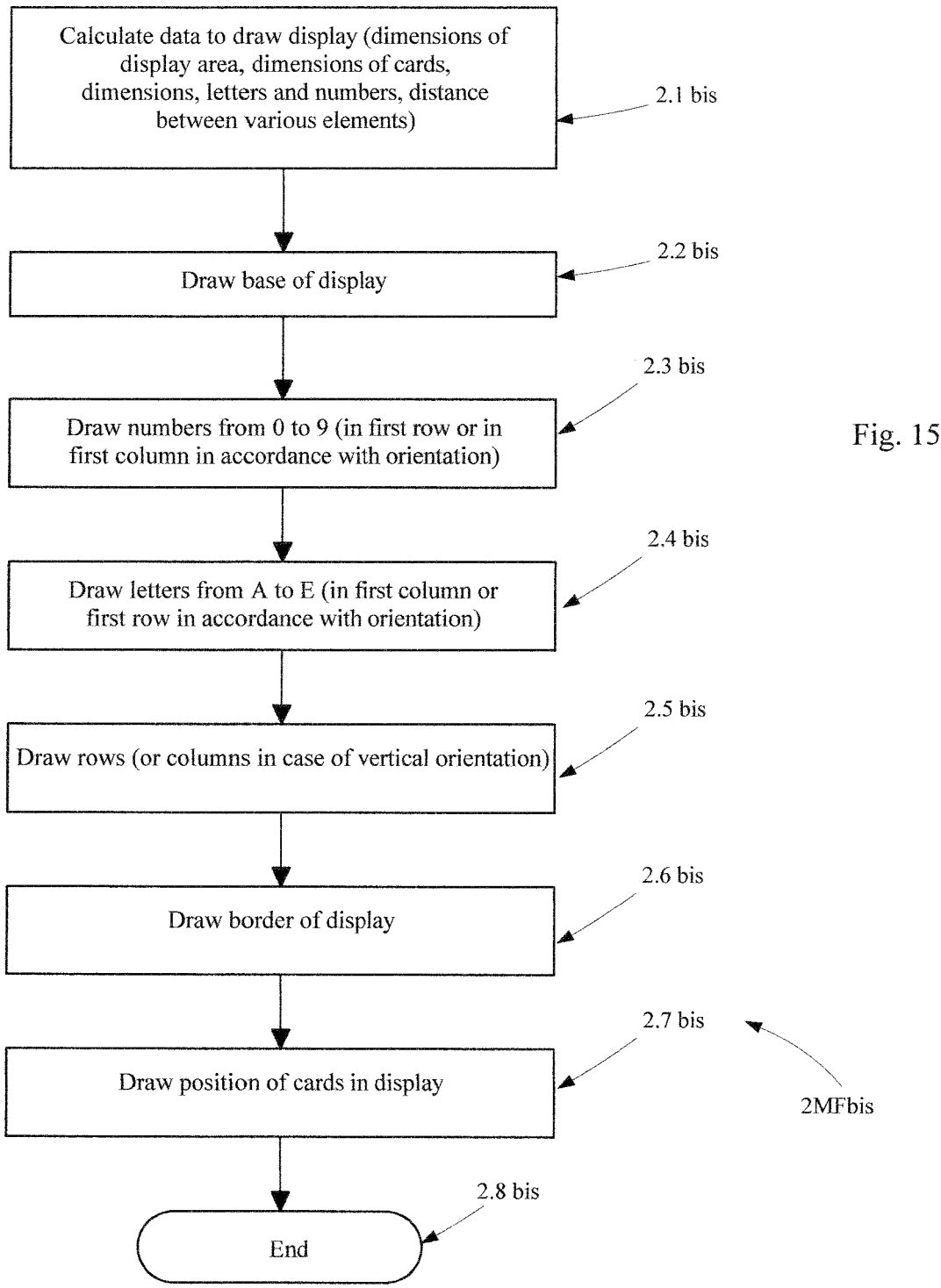
FIG. 15 is a flow chart showing another macrophase of the method of the present invention.

An example for displaying on the monitor this matrix, with which the cards have not yet been associated, is the one set out in the macrophase 2MFbis illustrated in FIG. 15 in which a matrix of "empty cells" is illustrated, each cell is identified by a pair of alphanumeric characters which substantially represent the coordinates thereof, for example, the first alphanumeric character of the pair may indicate the row number in which the cell is positioned (for example, in the subgroup it is positioned in the third row) and the second alphanumeric character of the pair may indicate the column of the cell (for example, it is in the second column). The pair of numbers are therefore the coordinates of the cell. More particularly, in the step 2.1bis, the data are acquired in order to create the display and, therefore, there is produced the background on which the display is displayed (step 2.2bis), the numbers from 0 to n are indicated (subgroup dimension, in this case equal to 9) in the first row or column in accordance with how it is desired to orientate the matrix (step 2.3bis), similarly the letters from A to E are indicated in the first column or row in order to identify the various subgroups m=A, B, C, D, E if
the number of subgroups is 5 (step 2.4bis). Substantially each element of the matrix is identified with a pair of alphanumeric characters, in this case a number and a letter. Therefore, there are effectively indicated the rows of elements (step 2.5bis) and completely supplementary elements such as the edge of the display (step 2.6bis) and only at the end are the positions of the various cards displayed (step 2.7bis) before finishing (step 2.8bis).

The display of that matrix and the association thereof with the cards is brought about as follows (see appended FIG. 3): a card counter p is initialized, p initially being set so as to be equal to 0 (step 2.1). The matrix (Ma(i,j) is calculated as follows: the first column is calculated by setting i=p modulus (n) (having established that the matrix that it is desirable to form has 10 columns, there is obtained i=p modulus (10)). The definition of modulus is the standard one in which x modulus (y) (otherwise indicated as xmody) is calculated as:

$$x \bmod y = y\left(\frac{x}{y} - \left\lfloor \frac{x}{y} \right\rfloor\right)$$

where $\lfloor x \rfloor$ is the whole lower portion of x (step 2.2).

The corresponding row is calculated as j=ceiling (p/10) where the ceiling function(x) is the smallest integer not less than x (step 2.3). There is then selected the card from the pack which is at the position indicated by p (that is to say, there is taken the card which is in the position vetcar(p) described in the macrophase 1 MA and therefore each card is identifiable with a number), step 2.4. It is important to note how this step 2.4 is carried out successively in the sense that initially only the subdivision into subgroups is displayed on the monitor 20, as seen in macrophase 2MAbis of FIG. 15, with which only afterwards the card will be associated as described in this step. At the position (i,j) calculated in this manner in steps 2.2 and 2.3, there is assigned the card which is in the position p of the vector (step 2.5) or Ma(i,j)=vetcar (p). It is then verified whether p is strictly less than 50 (having excluded 2 cards from the pack in order to form a matrix of 5×10, p is from 0 to 49 in order to take 50 cards), step 2.6. In the negative case, there is set p=p+1 (step 2.7) and the values of (i,j) are recalculated, respectively, for that value of p and there is then assigned to the position (i,j) of the matrix the card in the position p of the vector vetcar(h), until the 50 cards are obtained and therefore the macrophase 2MF is terminated (step 2.8).

Similarly, in the case of m different rows having different lengths, it is possible to take consecutive "slices" of the vector vetcar(h) in order to form the various subgroups, that is to say, sottogrup(t)=vetcar(h) for h=0 . . . n−1, and h= a, . . . , a+n with a from 0 to T−1−n, each slice being able to be of an arbitrary length.

The q cards which are excluded (because the pack contains T=52 and not 50 cards) as mentioned above can be displayed in any manner on the monitor 20 of each player and therefore the cards with the indices j equal to 50 and 51 are displayed as "outside the selectable cards" in a portion of the monitor 20 of each piece of playing equipment 10*a*.

Therefore, each position of a card on the monitor 20, similarly to the position of the "cell" before an above-described card was associated with it, is given by two whole numbers, that is to say, the position of the cards on the monitor is given by sequences of pairs of alphanumeric characters, a card being associated with each pair of characters. Naturally, those characters may be numbers or they may be used in the display of the letters, or in the matrix Ma(i,j) each row may be, simply by way of example, identified with a letter A, B, C, etc., and within the same row the various cards may be identified with a number 1, 2, 3, etc., so that the card in the second row and third column is identified by (B,3).

It is very important to underline the fact that the subdivision into subgroups of the number of cards, and therefore the knowledge of the number of subgroups and the number of elements (each of which is successively associated with a card) each subgroup contains, is known and displayed to all the players even before the optional generation of the string of cards vetcar. In fact, the first thing which is displayed on the screen is an "empty" matrix Ma(i,j), that is to say, the player is informed of how many subgroups there are and how many elements each subgroup has before knowing which cards there are in each subgroup itself (see again the macrophase 2MAbis of FIG. 15).

The position of the cards, or the generation of the vector vetcar, and the division thereof into subgroups may be carried out within the gaming server 10*b* which is the server of the public gaming agent, and therefore that sequence may be distributed to all the pieces of playing equipment 10*a*. An important aspect of the present invention, as mentioned above, is the transparency and security for the players and, to that end, the arrangement of the cards for all the players is the same. The "arrangement" in the present context is intended to be understood in the following manner: since the vector vetcar leaving the macrophase 1MF, or the "shuffled" vector of the cards, is the same for all the pieces of playing equipment, it is preferably created in the server 10*b* and transmitted to the various pieces of equipment 10*a* in an identical manner. Similarly, the subgroups into which the vector vetcar is subdivided are the same, or the number of subgroups and the ordinate in which the cards are arranged in each subgroup selected in this manner is the same, or the pieces of the vector vetcar which are taken as subgroups remain unchanged and the same for all the pieces of playing equipment 10*a*. The number of subgroups into which the cards are divided, and into which ones, is generally established by the type of game which is taking place and therefore is not arbitrarily established by the server 10*b*, for example, in common draw poker there must necessarily be 5 subgroups in order to create 5 rows, from each of which to select a card of the player.

The fact that the vector vetcar is not generated by the piece of playing equipment 10*a* but by an external and independent server 10*b* also increases the security because the association of elements of the subgroups/cards in the vector vetcar may also be carried out after the various players know which "combinations of cards" they will have as their personal cards, that is to say, after there has already been identified for each player the combination of elements which constitute the Q personal cards of each player. This important aspect will be set out in greater detail below.

However, it is possible, for greater accessibility and clarity of the game, for the different subgroups, in other words, as an example, the different rows of the matrix Ma(i,j), to be able to be changed for each other in the display, that is to say, in memory the matrix always remains with fixed rows and columns, but these may be positioned differently from each other on the screen in accordance with the selections of the various players. In other words, the sequence/order of cards in each row remains the same for each player, but the arrangement of the rows (such as the row 1, 2, etc., displayed on the screen) may vary from player to player only as a display on the monitor 20.

Even more preferably, the generation of the vector vetcar and the subdivision thereof into subgroups such as, for example, the generation of the matrix Ma(i,j), is controlled by another server, not the server 10*b*, but instead the server 11 which belongs to a control unit which controls the transparency of the operations. In order to further increase the security, the generation of the vector vetcar itself may be carried out by the server 11 which will then send it to the server 10*b* which will carry out the distribution of the vector to all the pieces of playing equipment 10*a*. If the sequence of the vector vetcar is carried out directly by the "third" control unit, that is, by the server 11, each player would have the certainty that the proprietary gaming agent of the server 10*b* cannot in any way assist any player (=piece of equipment 10*a*); this concept will also be set out in greater detail below.

Figure 8:
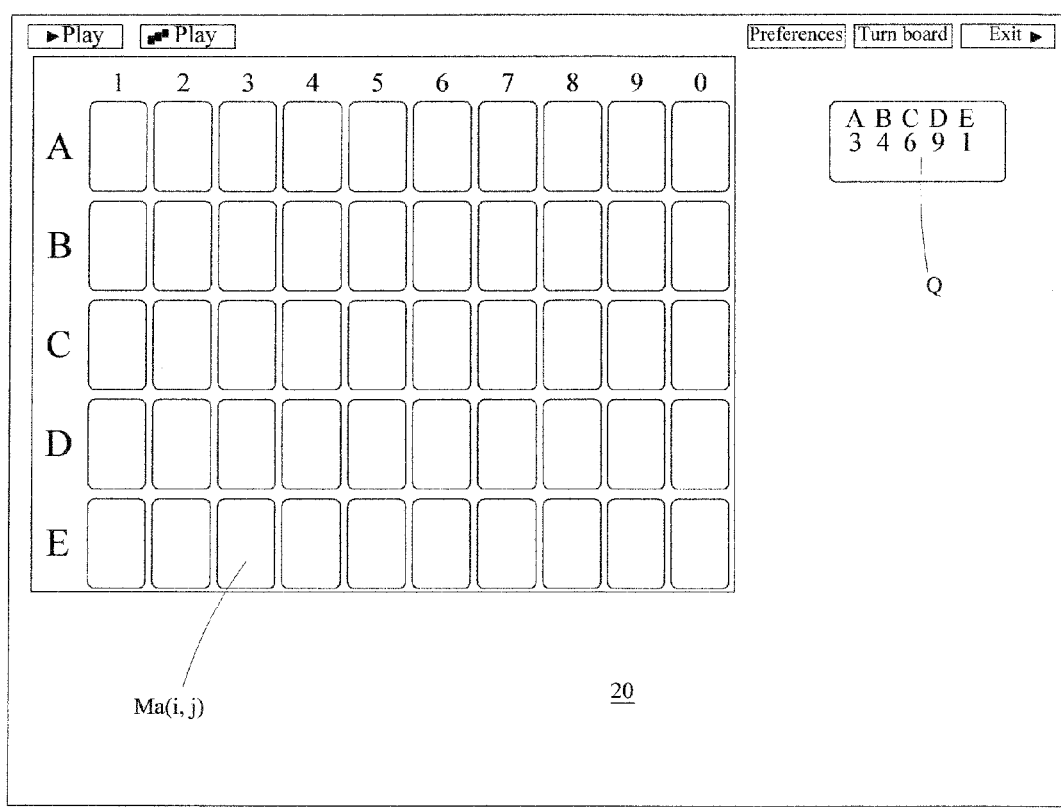
FIG. 8 is a display of a step of the method of the present invention.

FIG. 8 illustrates a possible display of the various subgroups before there is associated with each of the elements of each subgroup a card (that is to say, before the step 2.4 in which the display is of the "empty" cells, each cell being unambiguously identified by the pair of alphanumeric characters) on the monitor 20. The empty cells are arranged in a matrix Ma(i,j) in which the rows are named A to E and there are 10 columns (from 1, 2, 3 . . . to 0) for a total of R=50 cards.

From this distribution on the screen of the various elements, from which the player learns that (see the example of FIG. 8) the number of elements is subdivided into 5 subgroups and each subgroup is composed of 10 elements, there are selected the Q elements which will constitute the Q cards for each player using the piece of playing equipment 10a. The elements are selected in the following manner, in accordance with the third macrophase 3MF of the method of the invention set out in FIG. 4. It is important to emphasise that the selection of the elements Q is still carried out at the level of "elements", that is to say, even before the playing cards are associated with the subgroups, that is to say, in other words, even before the vector vetcar of cards, which at that time in the pieces of playing equipment 10a could also not be present, is associated with the subgroups.

For each subgroup m, within the elements which compose the subgroup, there is randomly selected a single element. This is carried out for all the subgroups displayed which compose the R displayed elements, that is to say, for each subgroup one and only one card is selected and forms part of the Q cards of the player. The elements displayed in which there is not randomly selected an element form part of the elements q excluded from the selection. Therefore, for each player using the piece of equipment 10a, part of his elements Q, with which playing cards will only be subsequently associated so as to constitute the Q cards for the game of a hand of poker, is given by the random selection of elements from the subgroups m, in particular for each subgroup m a single element is selected. As a first example, considering the subgroups as ordinate vectors sottogrup(t), there is selected a random number k between 0 and n−1 where n is the dimension of the subgroup and for the given subgroup the element assigned to the player is equal to the element of the player=sottogrup(k). As another example, in the case of display by means of a matrix Ma(i,j), there is selected an element for each row of the matrix which represents a different subgroup, from the first row of the matrix Ma(i,j), that is to say, there is set j=0 (or equal to 1 in accordance with the convention used, step 3.1), from the n elements (the first row being constituted by Ma(i=0, . . . , n−1, 0)) constituting the first row, one is randomly selected, for example, by means of a random number generator standardized between 0 and 9 (step 3.2) and the element selected which corresponds to a specific column j in the matrix is stored (step 3.3) (that is to say, the randomly selected element corresponds to a specific pair (i,j) for which Ma(i,j)=an element selected randomly). It is then verified that this is not already the last row of the matrix (in the case of five rows as in this case starting from 0, it is verified that j is strictly less than 5 (in this example m=5), step 3.4), in the event that j is less than 5 it is set that j=j+1 in order to move to the following row of the matrix and the steps from 3.2 to 3.3 are repeated (step 3.4), otherwise if j is equal to 5 (or greater) the selection is ended by interrupting the macrophase 3MF (step 3.6) of the method of the invention. In that manner, there are selected a number of elements Q equal to the number of rows of the matrix (in this case equal to 5) and each element among the Q elements is selected from a number n of elements.

Still with reference to FIG. 8, the alphanumeric characters which identify the positions of the Q elements of the player who uses the equipment 10a whose monitor 20 is illustrated in the Figure are displayed in the upper region on the right:
A B C D E
3 4 6 9 1
that is to say, in the row A he will play with the element 3, in the row B with the element 4, and so on.

This numerical sequence which establishes the Q elements of the player, that is to say, the Q elements with which Q cards with which the player who uses the piece of equipment 10a will play his hand are associated, is also preferably generated by the server 10b; naturally there is generated a different sequence of Q elements (each identified with a row and column index of the matrix) for equipment 10a, therefore there are generated a number of groups of Q elements equal to the number of players and sent from the server 10b to the pieces of equipment 10a.

Therefore, the association with each player of Q elements, one element for each subgroup, substantially comprises the association with each player of Q pairs including two alphanumeric characters, a first character identifying the subgroup and the second character identifying within the subgroup which element has been selected. The entirety of these pairs is called "sequence of Q elements" of the player below.

Alternatively, the sequence of elements Q is generated by the single piece of equipment 10a and then transmitted to the server 10b. It should be noted that the sequence of Q elements with which the single player will play his hand may be identified even before the strings of cards vetcar are generated and before the subdivision thereof into subgroups; the Q elements further do not represent Q pairs of alphanumeric characters and therefore also at a time after the generation of such pairs, they can be associated with a real card, which association is carried out by the generation of vetcar and the subdivision thereof. This aspect of the invention, or the fact that the elements which will constitute the cards with which each player will carry out his playing hand can be identified even before the sequence of cards vetcar is generated, substantially increases the security and transparency, in particular because the vector vetcar may be generated, as set out above, by a completely independent unit such as the server 11.

Another preferred embodiment comprises the possibility at the server side 10b of generating beforehand a plurality of sequences of Q elements, that is to say, a plurality of the various pairs, and of connecting them to each other in groups, each group constituting the cards of a player. Those groups may also be generated in a non-random manner (or without using the step 3.2) but the distribution of the various sequences is carried out in a random manner with respect to the various pieces of equipment.

In addition, the selection of the sequence of elements within the subgroups, always taking note of the rule that only one element may be selected for each subgroup, may also be carried out differently, that is to say, the same player, for example, may select for each subgroup the desired element (for example, a player wishes to use the sequence of numbers which he considers to be lucky for himself), in each case the game continues to be extremely transparent because the vector vetcar has not yet been generated and therefore it is impossible to know the cards in advance. The sequence of Q elements selected by the player then has to be sent by the piece of equipment 10a to the server 10b and the server 10b has to give its approval for use thereof.

Figure 3:
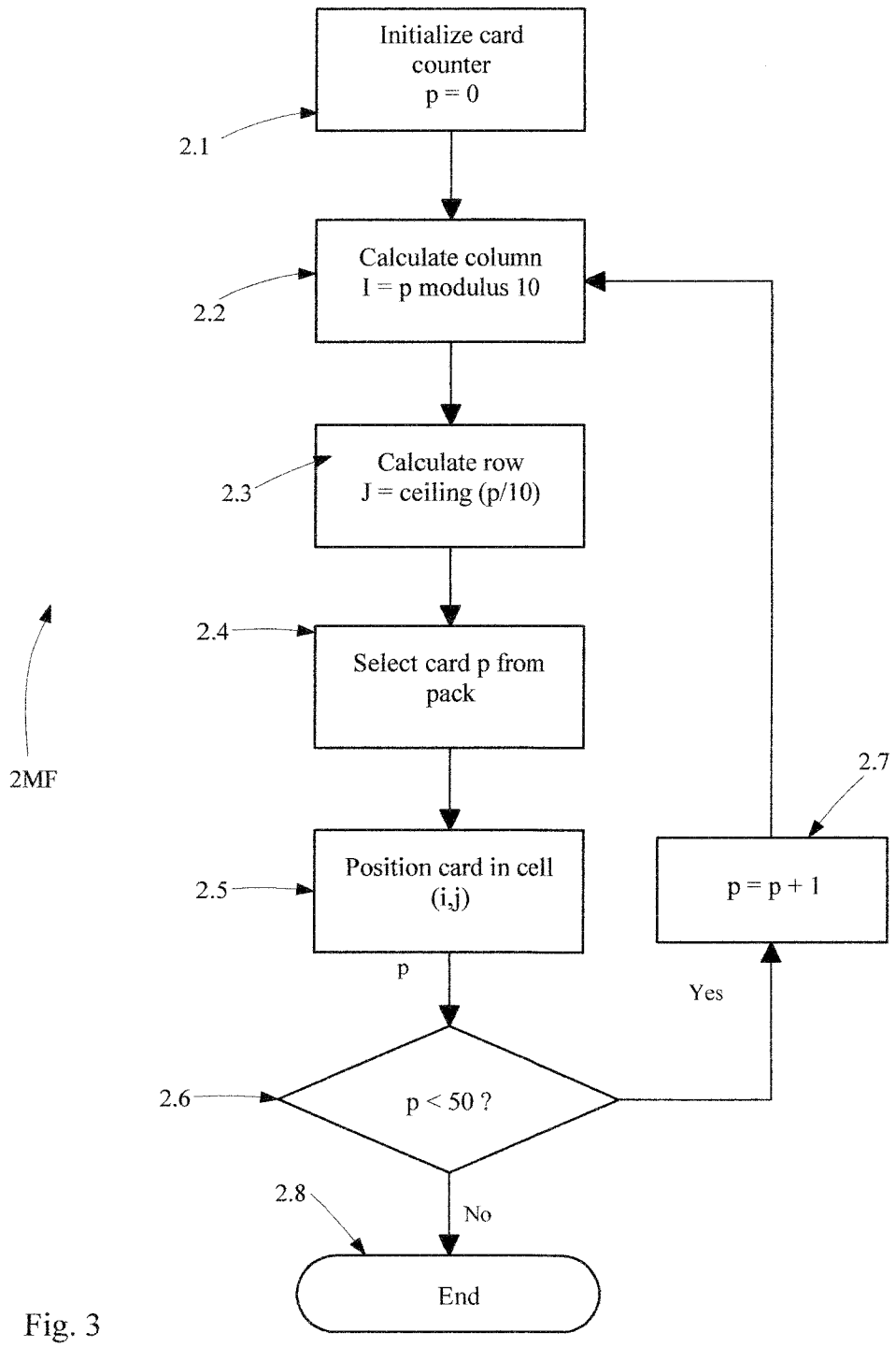
FIG. 3 is a flow chart showing another macrophase of the method according to the invention.
Figure 4:
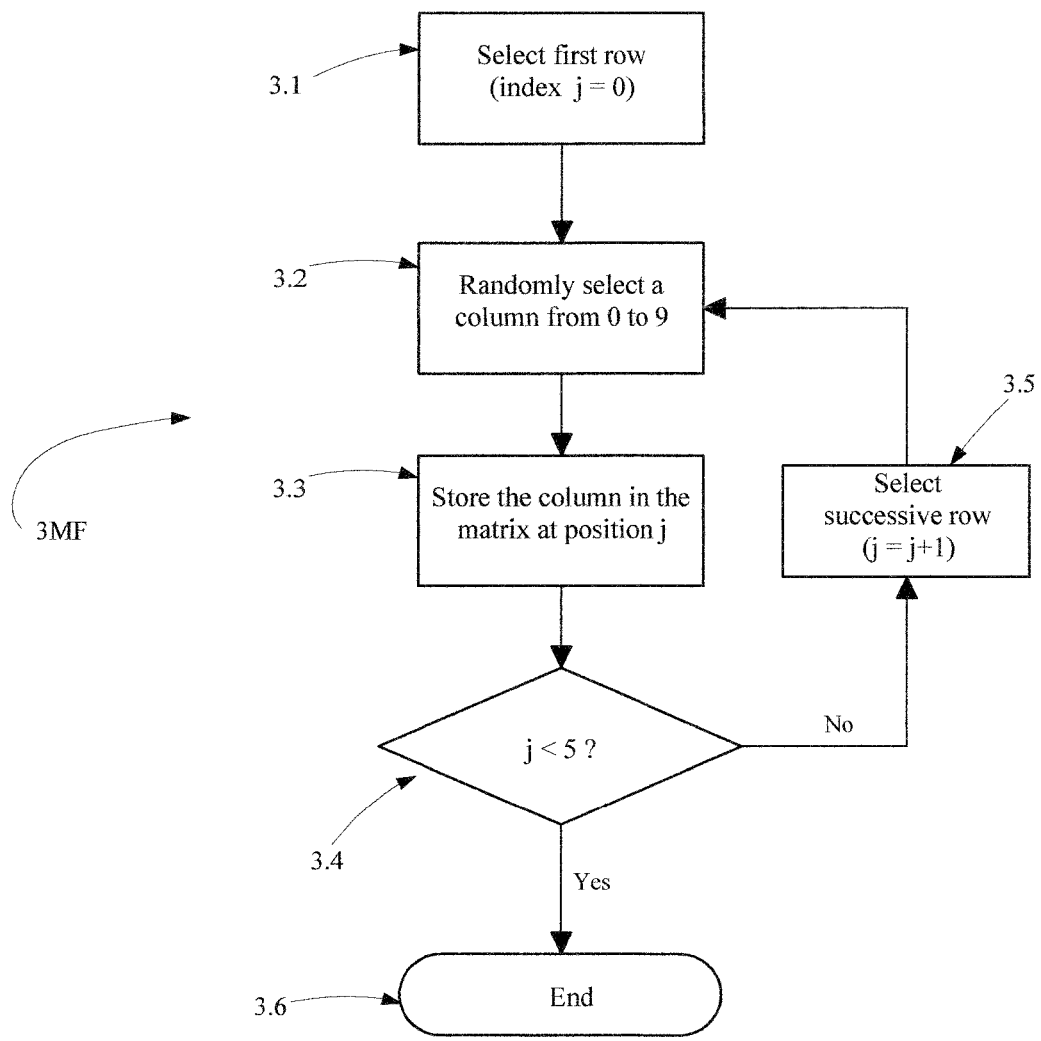
FIG. 4 is a flow chart showing another macrophase of the method according to the invention.

Therefore, only after the selection of the sequence of Q elements is there effectively associated with the displayed subgroups the card of the vector vetcar, or as mentioned the vector vetcar is "subdivided into pieces" and associated with the subgroups, set out in greater detail with reference to FIG. 3 and the description of the macrophase 2MF set out above.

The matrix Ma(i,j) on which the selection of the sequence of elements is carried out for each player is visible to all the players. In the case of draw poker discussed up to this point, the five elements selected as described above are associated with 5 cards and the five cards selected in that manner constitute all the cards Q of the player. However, it is possible for the cards selected in that manner to be only a portion of the Q cards of the player because the Q cards are also composed of common cards or cards selected in a different manner. It is further possible as mentioned for the various m subgroups to be composed of a different number of cards (that is to say, not all the subgroups have the same cards), in that case the macrophase 3MF will have the suitable adaptations for the selection of the cards.

Naturally, it is possible to select a lower number of cards by changing the matrix, for example, or by creating a different matrix: still retaining a pack of T=52 cards, it is possible to form matrices Ma(i,j) of 3 rows, each of which includes 17 cards and one card q is excluded from the selection. In a manner similar to the one set out, there are randomly selected three elements, with which three cards will be associated, an element selected randomly in each row of the matrix. Those three elements selected, subsequently associated with three cards, form part of the number of Q personal cards of each player.

The Q cards selected in that manner are only visible to the player who was using the piece of playing equipment 10a but those combinations must be known to the server 10b or because the sequences of Q elements have been generated for each player directly by the server 10b, or in the case in which the sequence of Q elements has been selected by the player, the server 10b has been informed of the sequence selected. There is substantial transparency during the game because each player knows the R cards from which each of the selectable cards of each other player can be drawn. In fact, the matrix displayed being the same for all the players, for each player it is clear from which cards (=row of the matrix) each of the cards of the opponents may be selected. Since the cards selected in that manner belong to each player (optionally also to other cards of the player which contribute to forming the Q cards thereof), they can, for example, be displayed so as to be separate from the matrix, for example, forming a new column of cards (or a new row of cards) beside the matrix, so that it is clear to the player which Q cards he possesses. Alternatively or additionally, the cards of the individual player may be shown in a different colour or with a different contour or with any other visual artifice on the matrix of the cards itself.

In addition, the fact that the selection of the sequence of the Q elements with which the cards are then associated may also be carried out in a preferred embodiment of the invention before the vector vetcar is available to the player or only the gaming server 10b (if the vector vetcar is generated by the server 11) ensures that either the server 10b or the player 10a can select sequences which lead to having "good cards" in the hand, the association "sequence of Q elements/cards of the player" still being unknown to them.

Figure 9:
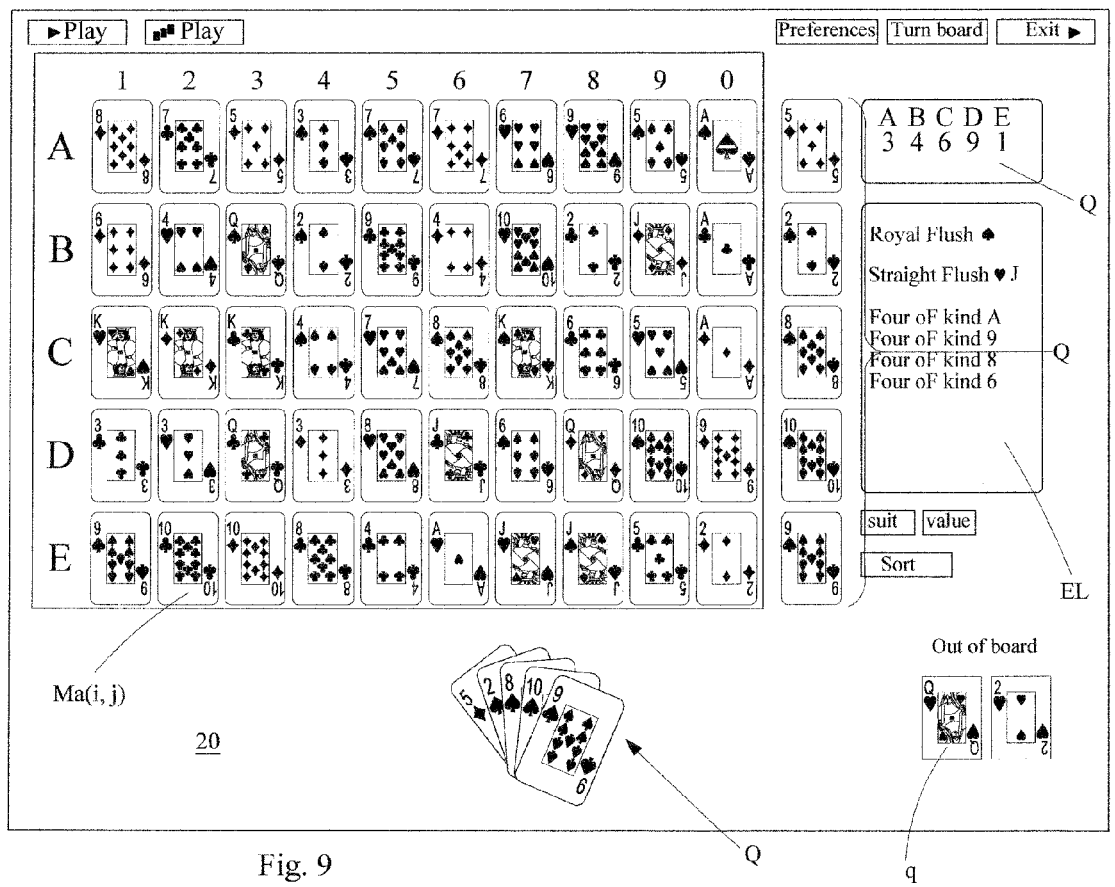
FIG. 9 is a display of another step of the method of the present invention.

In FIG. 9, for example, which is successive as a step of the method in FIG. 8, the cards can be seen in the positional sequence thereof or the matrix Ma(i,j) is displayed on the monitor 20 where each row from A to E represents a subgroup, each one composed of the same number n of elements (that is, ten), with which the association subgroups/cards of the vector vetcar has been carried out. All the players see and play with the same identical sequence of cards vetcar because it is transmitted to everyone by the server 10b (or all the players have the same matrix displayed), in the accepted meaning of the term sequence first identified (for example, the rows may be changed for each other, instead of the sequence of rows A, B, C, D, E the sequence A, C, E, D, B may be shown). The Q cards of the playing combination of the user using the piece of equipment 10a displayed are indicated by a frame around them, in addition the same Q cards are positioned outside the matrix to form a column separate from the matrix itself to the right for a better visual synthesis (that is, the additional lateral column can be seen in the matrix to the right) of those people playing and the same Q cards are still placed in the form of a fan in a lower region (always in order to provide a view which is similar to the customs of the traditional game of cards not online) below the matrix. Naturally, other displays are possible and they can be either predetermined or selected by the user using the piece of playing equipment 10a.

It is further preferable for there to be further displayed, for example, in FIG. 9 in the square on the extreme right, a list EL of the highest scores which can be achieved with the cards present and the availability thereof, optionally being able to be displayed by moving the cursor of the mouse.

There can further be seen in FIG. 9 the q cards from which it is not possible to carry out a selection of the Q cards of the player, that is to say, the q cards which do not belong to the matrix Ma(i,j), and from which the Q cards of each player cannot be selected, in such a manner that, in this preferred embodiment, the total of the R cards of the matrix Ma(i,j) and the q cards constitute all the T cards of the pack. The display of the T cards is always preferred for greater transparency and security.

The arrangement of the selectable cards in m separate subgroups solves another problem because the fact that it is possible to have a substantial number of players, each using a piece of playing equipment 10a and each of whom may have some of the same cards, substantially increases the probability that in each playing hand someone may obtain one of the 13 possible pokers or one of the 36 possible real runs (13 pokers and 36 real runs with this configuration of a matrix having 5 rows and 10 columns with 5 cards per player). With the cards being arranged in m subgroups from each of which a single card may be selected, some combinations of poker or a run are in fact impossible, for example, if two aces are in the same subgroup, and therefore only one of them may be selected and therefore included among the Q cards of each player.

Furthermore, the fact that the elements—which will constitute the Q cards of the player—are selected from the subgroups even before the vector vetcar is generated greatly reduces the number of data which are transmitted by the server 10b to the piece of equipment 10a. As mentioned above, the sequence of the elements Q belonging to each player may be either generated by the server 10b and therefore sent to the player using the equipment 10a or selected directly by the player and therefore sent to the server which has to know for each piece of equipment 10a which are the Q elements with which play is then carried out. If the exchange of information causes an exchange of cards which each player possesses (that is, the Q cards of the player "Pippo" are Jack of Hearts, King of Spades, Ace of Diamonds, three of clubs and two of hearts), the flow of data, particularly in the event of a large number of players being involved, would be substantial, or would require the transmission of a large amount of data, instead of exchanging only the sequence of the pairs of alphanumeric characters, or the sequence of the Q elements, identifying the position of the elements in the matrix (or more generally in each subgroup), the flow of data is substantially reduced and also reduces the waiting times of the game. In fact, the association "sequence of Q elements/playing cards" is carried out unambiguously by means of the same vector vetcar which is transmitted to all the players. The quantity of data which is used in making the exchange of information relating to the cards per se using only alphanumeric characters is very different, and greatly reduced with respect to the case in which information relating to all the cards has to be exchanged.

Figure 10:
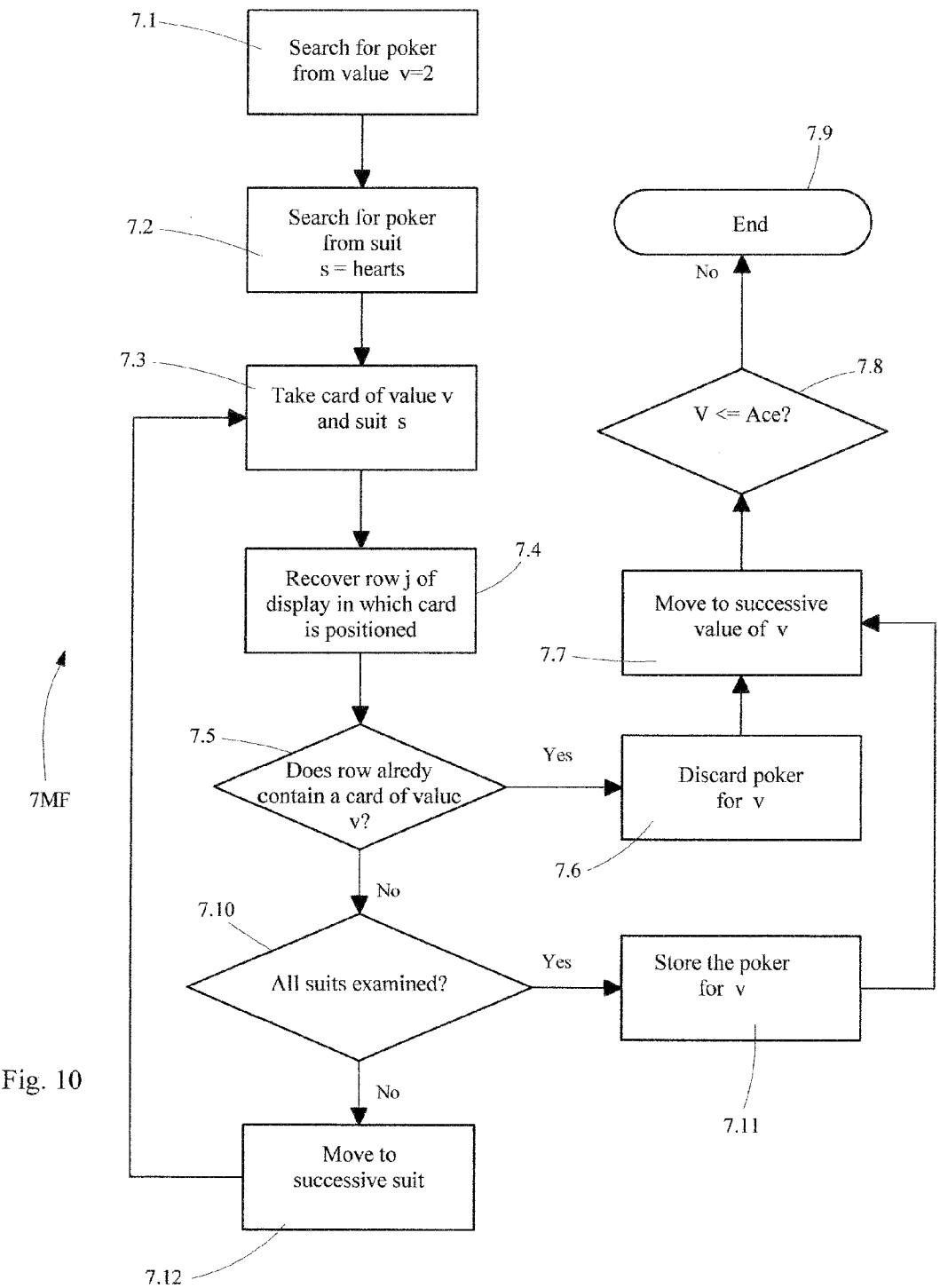
FIG. 10 is a flow chart showing another macrophase of the method according to the invention.
Figure 11:
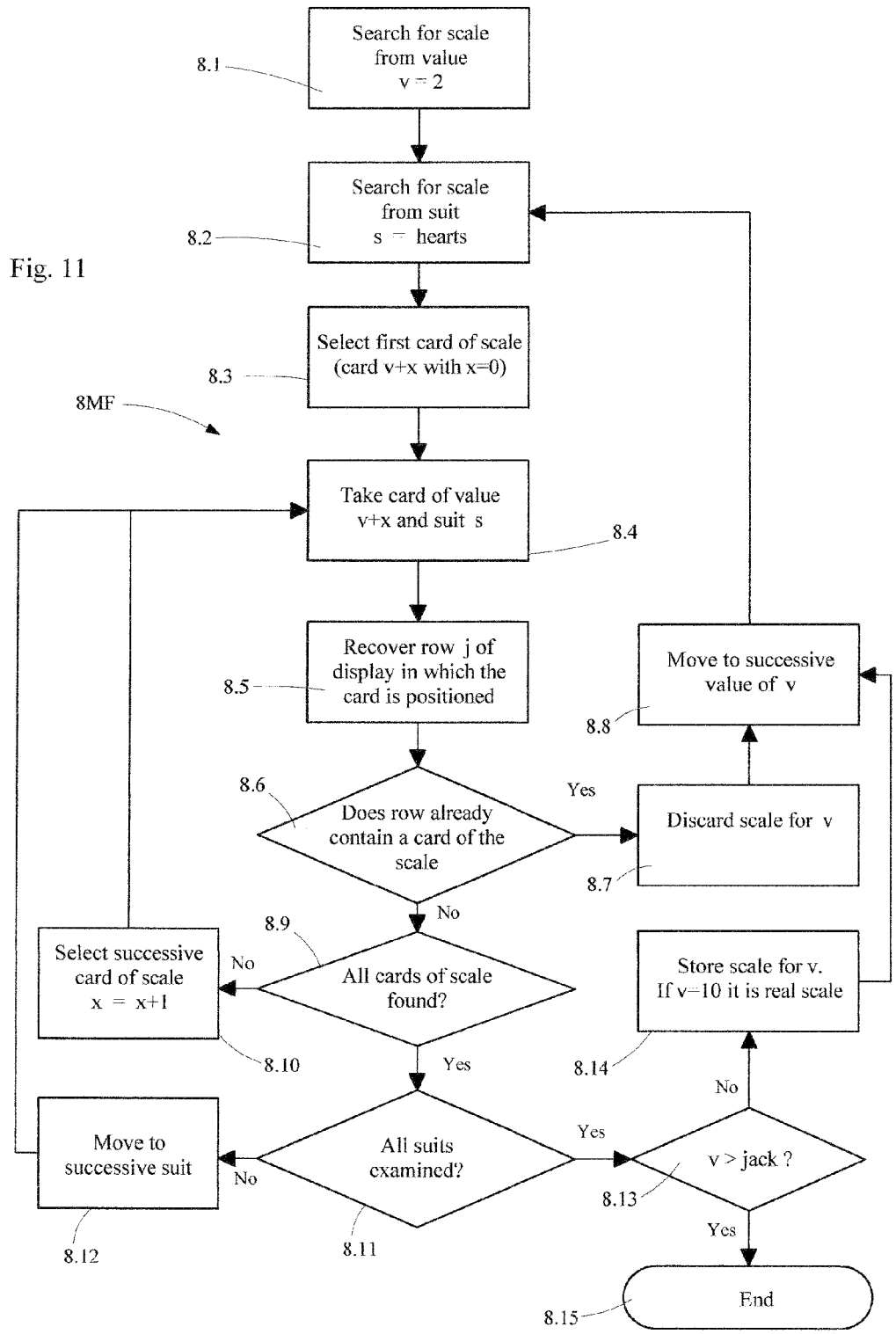
FIG. 11 is a flow chart showing another macrophase of the method according to the invention.

According to an optional feature of the invention, the method of the invention also includes two optional macrophases, the macrophase 7MF and the macrophase 8MF, illustrated in FIGS. 10 and 11, for calculating the number of pokers available and the number of real runs available, respectively, given the arrangement of the cards (and of course that if two aces, for example, are in the same row of the matrix, it is impossible to have a poker of aces). Given the large number of players, as mentioned above, the limitation of the points having higher value is a great advantage; in fact, if there were no such limitation, there would always be someone with a real run or a poker in their hand. This would discourage any betting.

In the macrophase 7MF (see FIG. 10), it is decided in the first step 7.1 to start by analysing, for example, the pokers in which the value v of the card is two (but obviously it is possible that it may begin from any value of the card), in particular starting from the value two and arriving at the ace (that is to say, the ordinate is v=2, 3, 4 . . . , J, Q, K, ace). Furthermore, in the step 7.2, it is established that the suit from which the pokers will begin to be sought is the suit s of hearts (the ordinate of analysis is, for example, s: hearts, diamonds, clubs, spades). In step 7.3, therefore, the card of the suit and value v is taken and, in step 7.4, it is determined in which row j of the matrix the card of value v and suit s is arranged. In the step 7.5, it is verified whether cards of the same value v are already present in the same row; if so, in the step 7.6, the poker having a value v is discarded. In fact, if both the cards are present in the same row, for the operation of selection of the Q cards per player described above, they can no longer simultaneously be in the hand for any player (that is to say, they cannot both be part of the Q cards of a player because a single card is selected per subgroup). If the poker is discarded, the step 7.7 moves to the successive value of v (as mentioned, supposing that they are arranged in increasing order, otherwise moving to the successive value of v in the manner in which the program has been predetermined) and then it is verified whether the value of the card is greater than or equal to the ace (which is the card which has the highest value, the cards in the analysis being arranged in increasing order of value), in step 7.8. Should v be the ace, the program ends because all the pokers have been calculated (step 7.9); if not, the process returns to the step 7.3 with the new value of v. In case (returning to the decision of step 7.5) there are not in the same row two cards both having value v, however, it is investigated whether all the suits have been taken into consideration (step 7.10). If so (that is to say that it has been seen that all four cards having value v are in different rows), the poker for that specific value of v is stored and a possible poker is considered (step 7.11) and, from that point, the process returns to the step 7.7 in which the value of v is increased. In the case in which all the suits have not been examined, however, an examination thereof is carried out by moving on to the subsequent suit (step 7.12) and then the process returns to the step 7.3. The number of pokers available is therefore preferably displayed on the monitor 20.

In a manner similar to the calculation of the number of possible pokers, there is calculated in the macrophase 8MF the number of real runs which can be achieved with that specific arrangement of the cards. In the first step 8.1, it is decided to begin by analysing, for example, the pokers in which the value v of the card is 2 (but obviously it is possible to begin from any value of the card), in particular the process begins from the value 2 and continues as far as the ace. Furthermore, in the step 8.2, it is established that the suit from which the pokers begin to be sought is the suit s of hearts (the order of analysis is, for example: hearts, diamonds, clubs, spades). In the step 8.3, the first possible card of the run is selected which is the card having a value v+x, where x=0 (that is to say, v=two). Therefore, the card having a value v+x and suit s is taken in the step 8.4 and, in the step 8.5, it is established in which row j of the matrix that card is arranged. In step 8.6, it is verified whether another card of the possible run is already present in that row j and, if so, that run is discarded for that value of v (step 8.7) and the process moves to the subsequent value of v (step 8.8), then returning to the step 8.2. If the question of step 8.6 is in the negative, the process moves to step 8.9 by verifying whether all the cards have been found in order to achieve a run and, if not, the subsequent card of the run is selected with x=x+1 (step 8.10), then returning to the step 8.4. If the answer is yes, for example, all the cards of the run have been found, it is examined in the step 8.11 whether all the suits s have been examined and, if not, the process moves to the subsequent suit (step 8.12) and then returns to the step 8.4. In the case in which all the suits have been examined, it is verified whether the value of the card v is greater than the jack (step 8.13). If v>jack, the system is interrupted (step 8.15), otherwise the run is saved and, if v is equal to 10, a real run is present (step 8.14). The value of v is increased in the step 8.8 and the process thus returns to the step 8.2.

According to the rules of the game of cards, the player may decide in some types of games to change some of the cards among his Q cards attributed to him. In the preferred example of the game of poker, the number of cards which can be modified, designated P, changes in accordance with the speciality of poker played. In the case in which the player decides not to change any card or in the case in which in the game of cards which is played there is no provision for changing cards and the hand is played directly with the assigned cards, the game continues and the winner of the hand is selected in accordance with the person among the players who are connected by means of the pieces of playing equipment 10*a* who has obtained the highest score in accordance with the rules of the speciality of poker played. The score of each player is calculated by the central server 10*b* and then transmitted to each player. Naturally, one or more of the other players connected may have carried out a change of cards in the manner described below. As mentioned, the change of cards is optional because there are some types of games of cards which provide for it and others in which it is not present, and therefore it is clear that it is only an optional step of the method of the invention.

In the case in which a number of players are connected by means of the network 100 and the majority of them, as generally happens, decide to change one or more of the Q cards which are assigned to them, a very consistent flow of data between each piece of playing equipment 10*a* and the server 10*b* would be required, slowing down the normal playing times. In fact, it would be necessary to communicate to the server 10*b* for each piece of playing equipment 10*a* which and how many cards to change; the new cards would have to be randomly selected by the server 10*b* and they would have to be communicated to each player and all the steps of this operation would have to be saved.

According to the invention, the change of the cards is carried out by means of an exchange string which is identical for all the players. That exchange string is a unidimensional vector (array) and may be identical for all the subgroups m (in case they have the same length n), for example, it may be the same for all the rows of the matrix Ma(i,j), or may change for each subgroup. Naturally, if the m subgroups have different dimensions, m exchange strings are necessary.

That exchange string may be, like the vector vetcar or the sequence of the Q elements of each player, generated directly by the central server 10b and by the server 11 and then transmitted to all the players. As mentioned, that string is identical for all the players. If that string is generated by the server 11, therefore, it would be difficult to tamper with both by the players and the overall gaming agent of the server 10b, increasing the intrinsic security of the game. Transparency and security are obtained whilst avoiding any need for controlling the assignment of the numerical combinations of the players (or the assignment for each player of what his Q cards are), the arrangement of the playing cards in the vector vetcar and the exchange string for the same person in a random manner: the server 10b which is precisely the controller of the game. If that were so, the controller of the server 10b and thus the gaming agent (for example, an agent of the state) could, for example, distribute the cards in vetcar in a non-random manner in order to assist a given player, of which he knows the playing combination, or to change the playing combination for the only player once the arrangement of the cards in the vector vetcar is known, or he could always change the numerical sequence of the exchange string so as to benefit that player. In the case of a game of poker with the jackpot, the agent could further, knowing all the combinations of the game, intervene in vetcar so as to thereby cause it not to be won by anyone, causing the value thereof to increase in order to attract the greatest number of players. The fact that the vector vetcar and the exchange string can be generated by a control administrator, a third party who is independent, such as the proprietor of the server 11, and is transmitted by that person to the server 10b, thereby increases the security perceived by the players using the equipment 10a.

Figure 5:
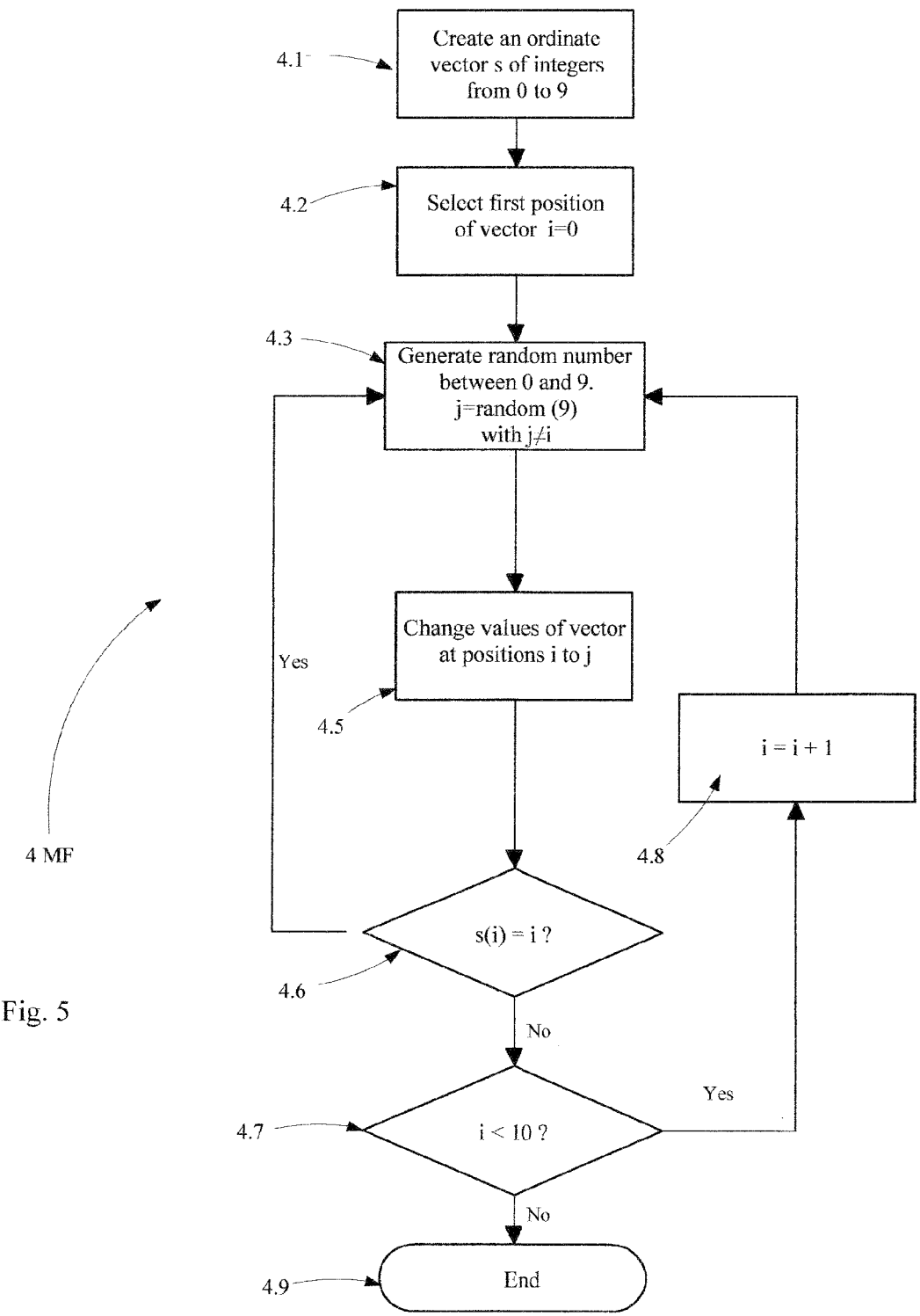
FIG. 5 is a flow chart showing another macrophase of the method according to the invention.
Figure 6:
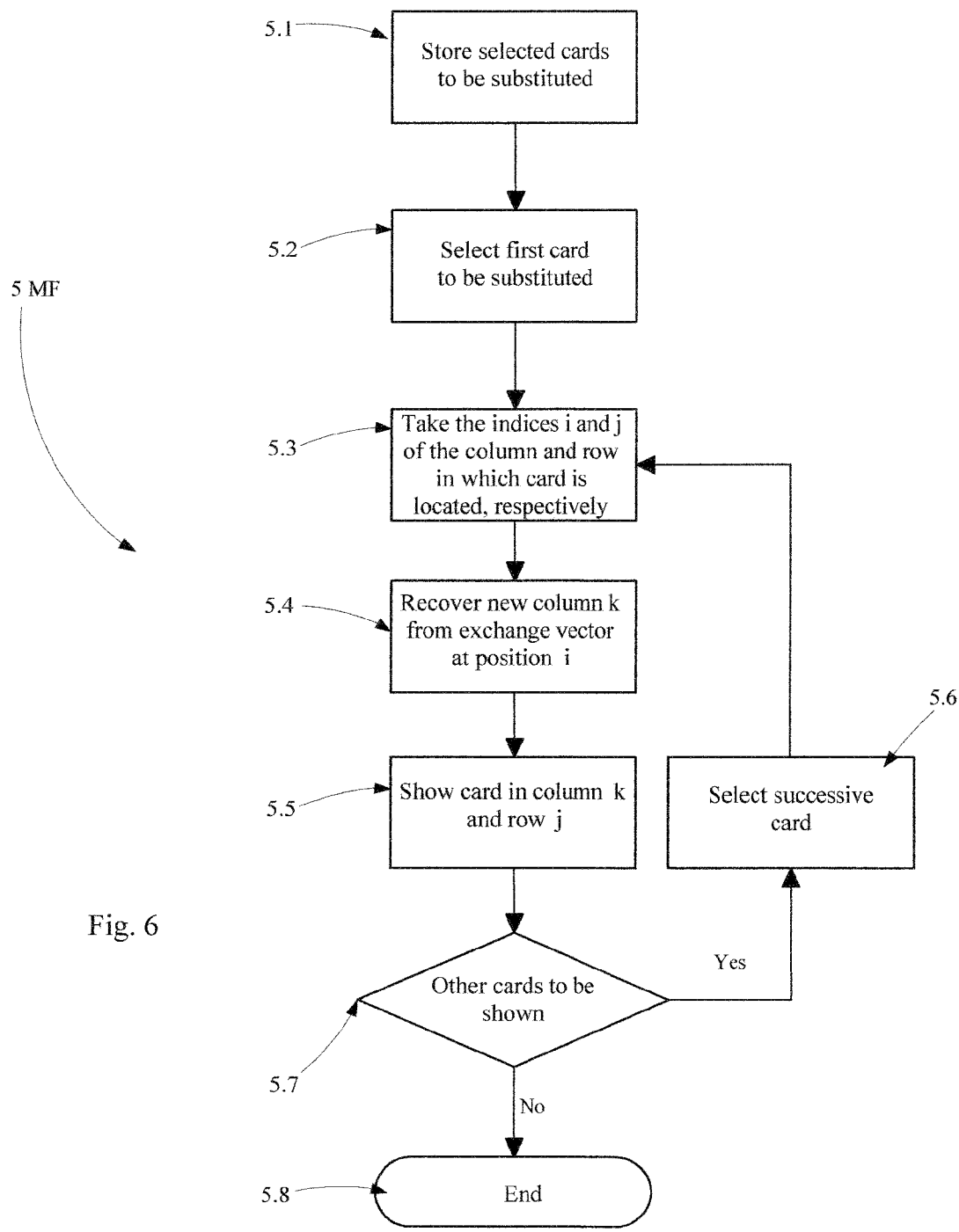
FIG. 6 is a flow chart showing another macrophase of the method according to the invention.
Figure 7:
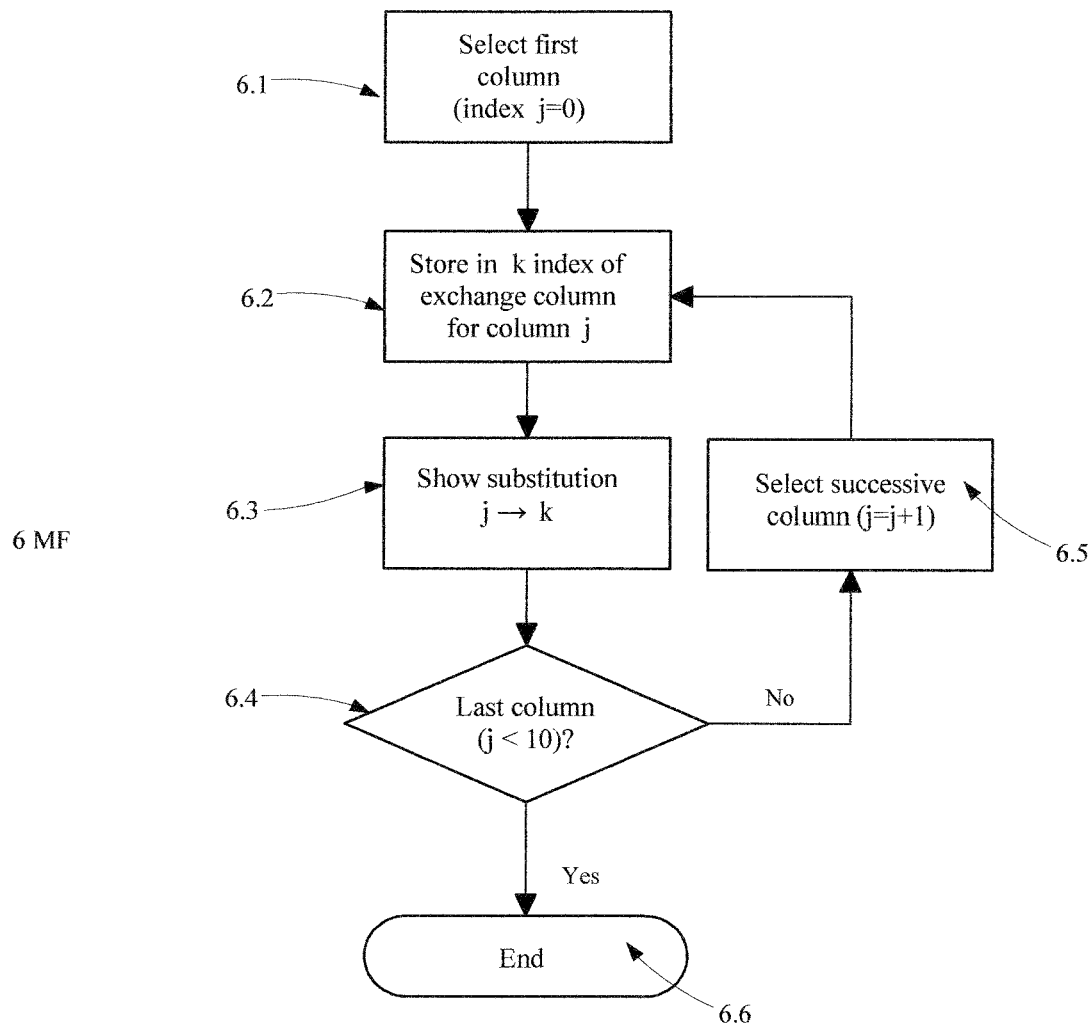
FIG. 7 is a flow chart showing another macrophase of the method according to the invention.

The exchange string is generated in the fourth macrophase of the invention 4MF illustrated in FIG. 5. There is thereby generated in the step 4.1 an ordinate vector of whole numbers s(i) with i being between 0 and n−1, where n is the dimension of an arbitrary subgroup, in this preferred example between 0 and 9 (because there are 10 columns in the matrix). Therefore, s(i) is a vector of the type (0, 1, . . . , n−1). There is then selected in the step 4.2 the first position of the vector s with i=0. In the third step 4.3, a random number j is generated, the random number being between 0 and n−1 and, furthermore, with j being different from i (in that case, j is between 0 and 9). The values of s(i) and s(j) are then exchanged within the vector in the step 4.5. It is then verified whether s(i)=i so as to prevent the exchanged element from corresponding to the same element in the step 4.6 and, if so, a random number j is recalculated starting from the step 4.3 in order to avoid—as will become clear below—the same element which it was desirable to exchange being re-acquired upon the request for exchange. In the negative case, that is to say, s(i) being different from i, the process moves to the step 4.7 in which it is verified that i<n (in this case n=10): in the affirmative case, it is set that i=i+1 in order to consider the successive number in the vector s(i) (step 4.8) and then the steps from 4.3 to 4.7 are repeated until the mentioned condition i<n is not false, which signifies that all the numbers of the vector s(i) have been considered and "mixed" and therefore the macrophase 4MF can end (step 4.9). In that macrophase, therefore, there is created a string of whole numbers (or more generally of alphanumeric characters) from 0 to n−1 distributed randomly along the string. A string s(i) generated in the fourth macrophase of the invention is therefore associated with each subgroup, that is to say, the macrophase 4MF is repeated for the number of subgroups (or the same string is associated with all the subgroups), thereby making the dimension of the vector s(i) equal to the dimension (that is to say, the number of cards) of the subgroup with which it is associated. The string s(i) then in the preferred examples has the dimension of the vector sottogrup(t), or of the row i of the matrix Ma(i,j). As mentioned, a different exchange string can be associated with each row of the matrix or the same exchange string can be associated with all the rows of the matrix. More particularly, an element of the exchange string (or of a different exchange string depending on whether there is a different exchange string per subgroup) is associated with each element of the subgroup, more preferably with each element of each subgroup. However, the same string is associated with a specific row of the matrix for each player using the equipment 10a in a specific hand of the game. The string generated is modified for each hand, that is to say, the macrophase 4MF is repeated for each hand of the game.

The exchange strings or the string in the case where a single string is generated for all the subgroups can also be generated even before the card vector vetcar is generated and therefore this aspect also increases the transparency and security of the system because, for example, assuming that the vector vetcar and the exchange string are generated by the server 11 and the sequences of Q elements by the server 10b, it is very difficult to have "control" of all the variables which can influence the specific cards of a single player. In fact, as seen, the macrophase 4MF is totally independent of the effective cards but acts only on the elements of the matrix which may still be considered to be "empty cells".

Therefore, the player selects, among his own cards Q, or the portion of the cards Q from which it is possible to carry out the exchange, which P cards he wishes to change. For each card which he wishes to modify, it corresponds to an element having a specific position within a subgroup considered to be a vector of elements from 0 to n−1, that is to say, it corresponds to an element defined by a pair of alphanumeric characters. Therefore, once the card is selected by the player, there is identified the subgroup from which that card will have been selected during the first random selection which has been described with reference to the macrophase 3MF, and then there is identified the position in the subgroup in which the card is positioned, that is to say, there is identified the index in which the card is positioned. In other words, given the vector sottogrup(t), there is identified the value $\tilde{t}$ for which sottogrup($\tilde{t}$)=card selected by the player for exchange. Now with consideration of the exchange string s(i) associated with that specific subgroup to which the card to be exchanged belongs, there is identified the value s($\tilde{t}$)=k. From that, the new replacement card assigned to the player at the position of the one thereof selected is the card sottogrup(k).

In the case of a matrix, the card identified by the player as being intended to be exchanged is identified by the values ($\tilde{i},\tilde{j}$) which represents an element of the sequence of Q elements. Therefore, there is identified the string relating to the row $\tilde{i}$ (which may always be the same string for all the rows) to be used, and there is identified the position $\tilde{j}$ in the exchange string s. At the position of the card identified by the pair ($\tilde{i},\tilde{j}$), that is to say, the card Ma ($\tilde{i},\tilde{j}$), in the Q cards of the player, the card is substituted at the position ($\tilde{i}$, s($\tilde{j}$)), that is to say, the card Ma($\tilde{i}$, s($\tilde{j}$)) which is positioned in the same row as the card to be substituted but not in the column j but instead in the column identified by $s(\tilde{j})=k$, that is to say, the new card is the one at the position identified by the element Ma $(\tilde{i},k)$. The card is replaced only in the list of the Q cards of the player; in the matrix Ma(i,j) as displayed on the monitor 20, all the cards maintain their initial position and no change is carried out, this exchange of cards is carried out only within the Q cards of the player and does not involve the matrix itself. That procedure is repeated for all the cards selected by the player which he intends to substitute. Therefore, the new Q cards are displayed at the position of the old ones, as described in the macrophase 5MF displayed in FIG. 6. In that manner, the only information which is exchanged with the server 10*b* is brought back to a string of numbers, that is to say, the exchange string(s) and the position of the exchanged cards (also able to be brought back to only some numbers because each card is identified by a pair of alphanumeric characters), the matrix or the subgroups displayed on the monitor 20 remain(s) the same for all the players and on the monitor there are changed only the Q cards of the player for each individual player in the manner described below.

Therefore, the exchange string carries out mapping between a subgroup of n elements with themselves, defining for each element with which element of the same subgroup it is associated in the case of change.

If the exchange string has also been generated by the server 10*b*, or by the server 11, it is then transmitted by the server 10*b* to each player using a piece of user equipment 10*a*. In fact, if the string is generated by the server 11, it is first transmitted to the server 10*b* from where it is distributed to all the players.

The connection between the equipment/server definitively resolves the issue of transparency. There are produced by the system three vectors, that is to say, the unidimensional vector vetcar(i) which determines the position of the cards, the sequence of Q elements which determine the cards which belong to a specific player (that is to say, the specific Q cards of a player) which may be considered to be a bidimensional array (being Q pairs of alphanumeric characters) and the exchange string s(i) which changes those cards (in case it is provided for), also a unidimensional vector. The string and vector vetcar are equal for all the players. The unique characteristic of the system is that those three vectors are produced in an independent manner in terms of time, that is to say, it is not bound by the dynamics of the game, thereby allowing an agent, a liable and independent third party (that is to say, for example, a liable agent who owns the server 11) to produce the sequence vetcar which generates the position of the cards on the monitor 20 and the exchange string (as mentioned, both similar for all the players who use the various pieces of playing equipment 10*a*) leaving the remainder of the playing operations to the controller (server 10*b*).

In order to better explain this concept, there will be described below an example still using conventional 5 Draw Poker. With this speciality, during the standard game, that is to say, in front of a gaming table as in the prior art, after distributing the five cards to each player the first round of bets begins. The second round of bets begins after the change of cards. The cards for the change are those removed from the pack. In order to simplify the example, let us suppose that each player decides to change one card. The dealer would therefore have to assign the first card of the pack to the player on his left but, if he has abandoned the playing hand, the card which would have been given to him instead passes to the successive player still in the game. The causality of the distribution of the cards thus depends on the selections of the players and the dynamic of the game. Those playing dynamics therefore gradually impose control of the operations based on chance and are therefore impossible to predetermine.

However, with the equipment 10*a*/server 10*b* or 11 of the invention, the change of cards is carried out with the logic of the exchange string and thus with the substitution of the card to be changed for another in the same row of the matrix Ma(i,j). Therefore, if a player decides to abandon the game or to change one, two or more cards, it does not determine any variation in the combination of cards which chance will have assigned to the other players. The advantage consequently involves the fact that it is possible to predetermine, in other words to produce, the sequence of the exchange string even before the game has begun. Not only the exchange string but also the sequence of the position of the cards it is possible to make it produce for a person who we shall call the agent (server 11) different from the poker room (server 10*b*). In practice, after attributing the playing combinations to all the players, that is to say, each player is aware of his Q cards in a "virtual" manner as a sequence of pairs of alphanumeric characters which will then be displayed in the matrix which will be distributed (those sequences of characters are, for example, the ones which can be displayed at the upper right-hand side in the diagram illustrated at the upper right-hand side in FIGS. 8 and 9), the poker room would ask the agent for the two sequences of the position of the cards and the exchange string, that is to say, the vector vetcar(i) and string s(i). The agent would transmit the two sequences only after receiving the playing combinations assigned by the poker room to the players thereof (that is to say, the sequence of Q elements for each player, which is a bidimensional array), which sequences are consequently no longer modifiable. This exchange of information could also occur in a simultaneous manner (the transfer of data from the server 10*b* to the server 11 and vice versa could be simultaneous), without either of the two persons thereby being at risk of coming into possession of the entire packet of information before the other. There is thereby achieved the certainty of the impossibility on the side of the poker room of being able to favour any player and therefore a substantial increase in security. The exchange of the numerical sequences between the server 11 and the game controller (server 10*b*) described above is only an example of such security systems which can be constructed owing to the characteristic of the three vectors which can be produced in an independent manner in terms of time. Therefore, all these data would be stored by the server 10*b* and 11 and would subsequently be able to be consulted by the players, therefore ensuring accessibility of the information.

Furthermore, the exchange of data between the equipment and server as vectors of alphanumeric characters (for example, the vector s(i) given by whole numbers) reduces enormously the quantity of data which has to be transmitted between the server and the equipment.

In the case of signalling, for example, the connection between the equipment 10*a* and server 10*b* (or 11) solves this problem because it makes this technique no longer productive because the personal cards of the players are also partially shared with others (as mentioned, the same card may be assigned to several players). In order to take again the example cited describing the prior art and what signalling is, the two cards of diamonds which, in conventional poker, it would not be advantageous to have because, owing to signalling, it is known that they are in the hands of our accomplice, with the invention it is instead possible with the change to have cards, on condition that they are in the same rows of the matrix as the cards which the user decides to change. Knowledge of this is part of the game itself. The non-selected cards among the Q belonging to each player remain displayed in an unchanged state and only the cards selected from the Q cards are modified with the new cards obtained by means of the exchange string, the matrix Ma(i,j) is not modified. If the Q cards are displayed, for example, as an additional column at the side of the matrix Ma(i,j), the exchanged cards are modified in that column, that is to say, the cards which had been selected by the player as being intended to be exchanged are substituted in the column by the cards which have been obtained by means of the macrophase 5MF. However, the matrix Ma(i,j) is always displayed in the same manner (for example, remains unchanged). The first card replaced (step 5.1 of FIG. 6) is therefore selected in the matrix Ma(i,j), this card is displayed (step 5.2) and the indices $\tilde{i},\tilde{j}$ are recovered which identify the position of the card in the matrix (step 5.3), those indices correspond to the pair of alphanumeric characters of the sequence which identifies the card of the player belonging to his set of Q cards. There is then recovered the value of the exchange string $s(\tilde{j})=k$ corresponding to the value of $\tilde{j}$, that is to say, the value of the card which was in the row $\tilde{i}$ in the position $\tilde{j}$ and which has been exchanged by means of the string with the card in the row $\tilde{i}$ at the position k with $s(\tilde{j})=k$ (step 5.4). In the matrix Ma(i,j), the cards are displayed in an identical manner at first, only the card belonging to the player who wished to change is exchanged in the additional column of cards which combines all the Q cards of the player. There is then displayed in place of the card in position $Ma(\tilde{i},\tilde{j})$ the card in the position $Ma(\tilde{i},s(\tilde{j}))=Ma(\tilde{i},k)$ (step 5.5). It is then verified whether there are other cards which are exchanged (step 5.6); if so, the steps from 5.3 to 5.6 are carried out again and, if not, the macrophase 5MF is finished (step 5.7).

Figure 12:
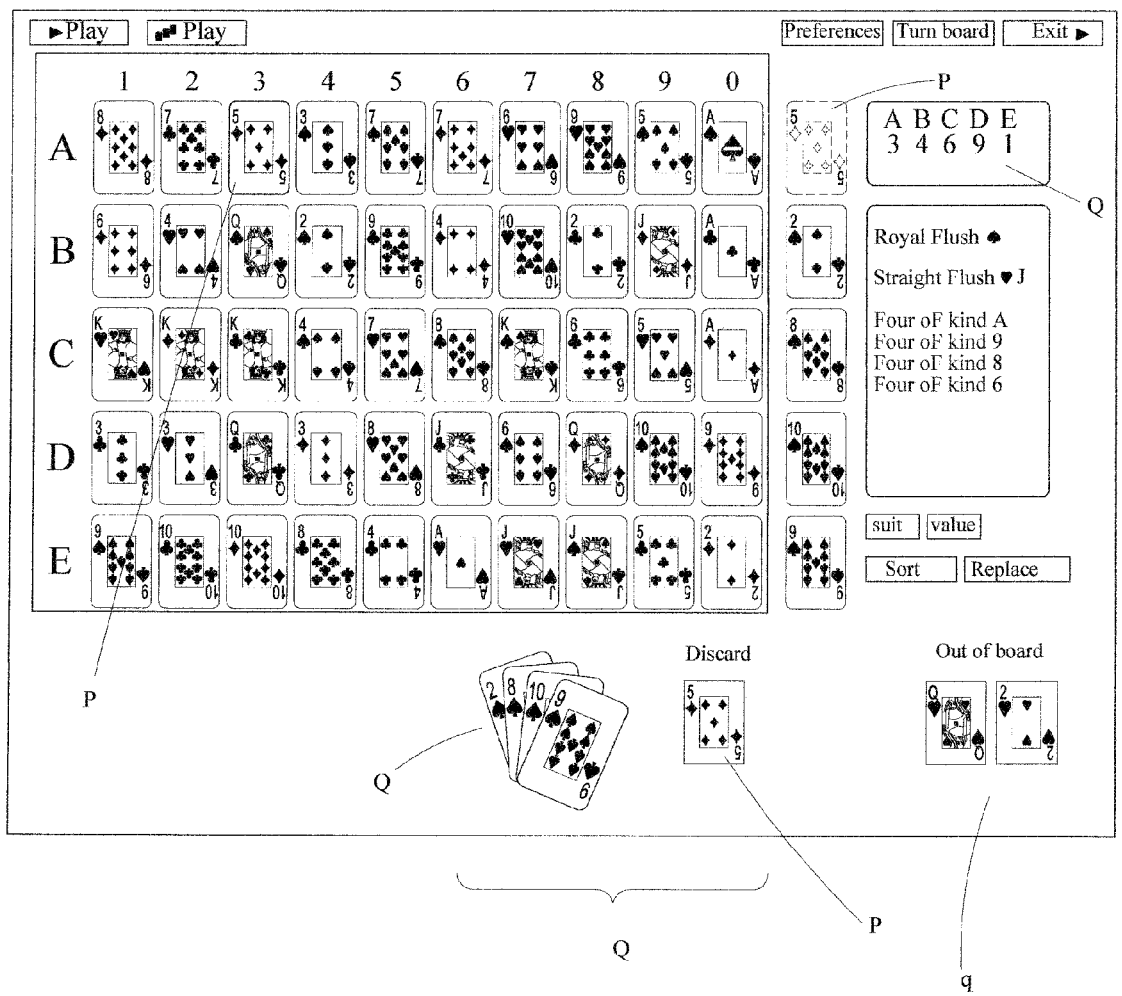
FIG. 12 is a display of another step of the method of the present invention.
Figure 13:
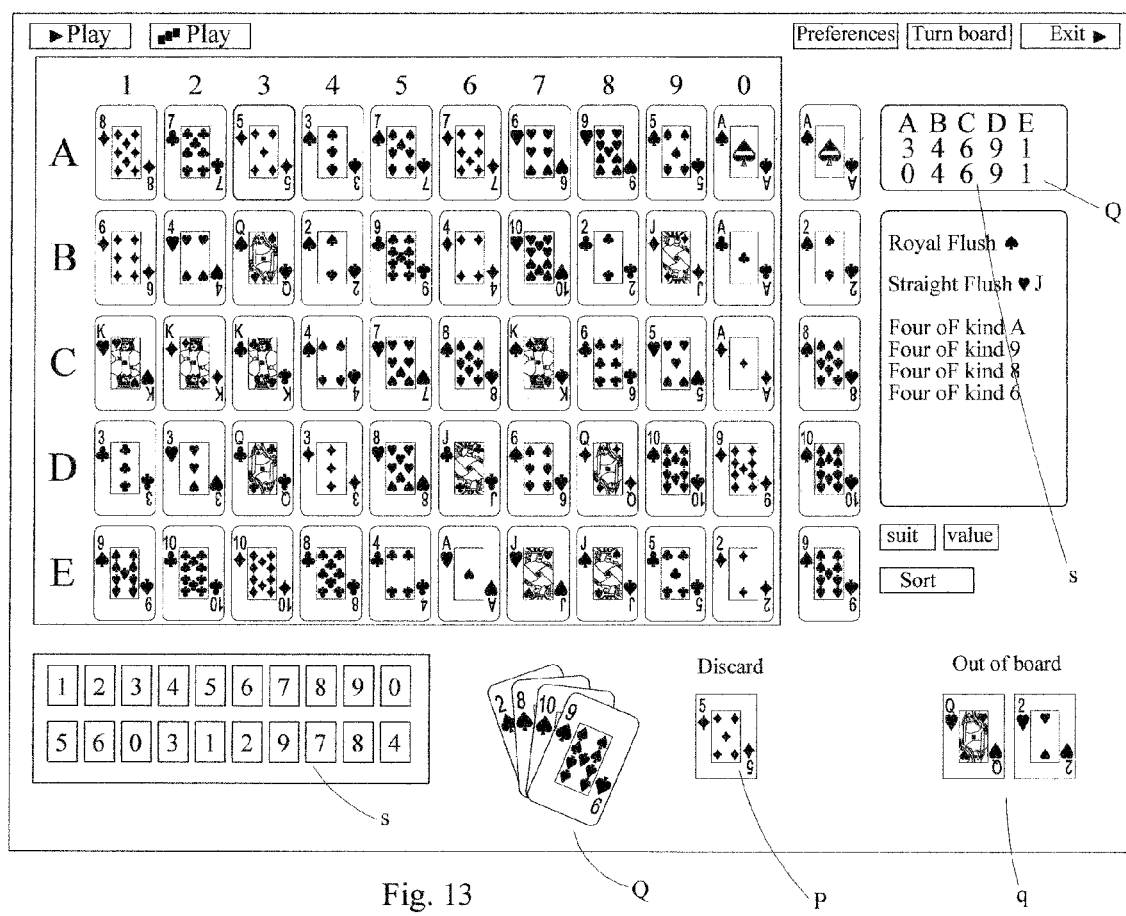
FIG. 13 is a display of another step of the method of the present invention.
Figure 14:
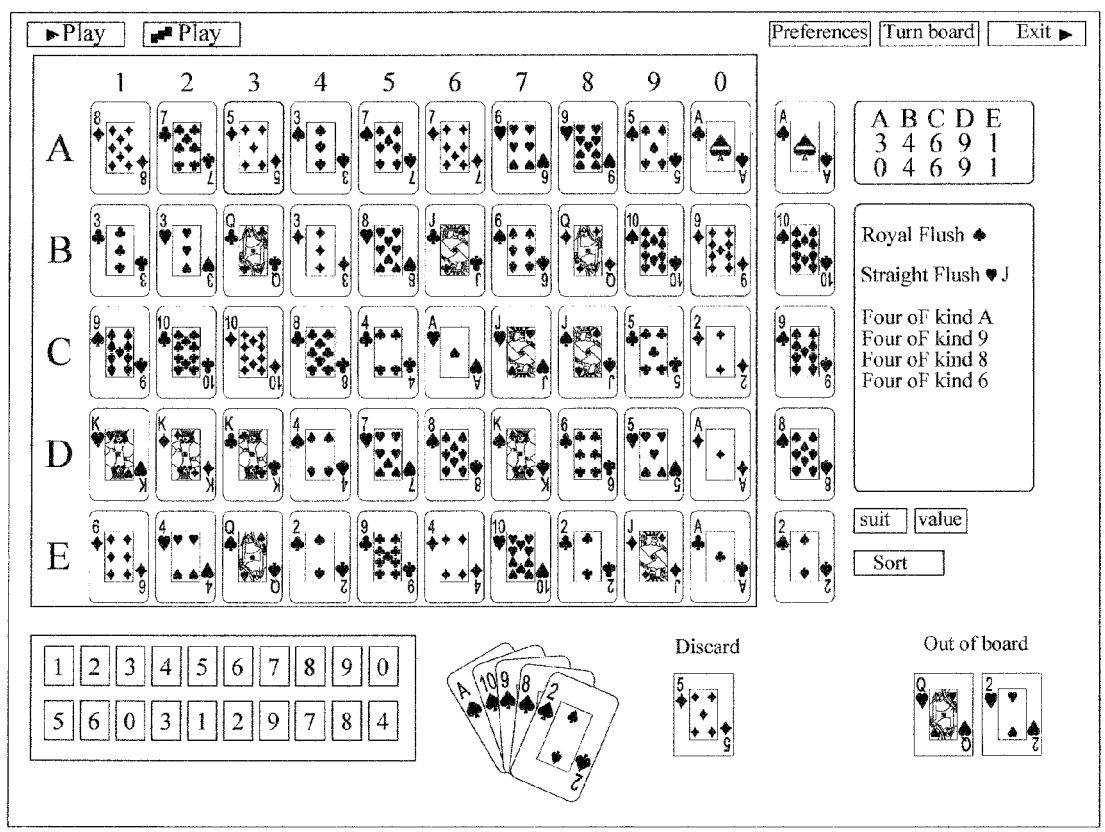
FIG. 14 is a display of another step of the method of the present invention.

The Figures from FIG. 12 to FIG. 14 show in detail the exchange of the cards. FIG. 12 is consistent with what is shown in FIG. 9, where the matrix Ma(i,j) was established and also the Q cards possessed by the player using the equipment 10a displayed were selected. In FIG. 12, the player decides to change a single card, his first card identified with the first pair of the sequence thereof of Q playing elements—and thus (A,3). That value (the pair of alphanumeric characters (A,3)) is then transmitted to the server 10b: during real communication between the equipment 10a and server 10b, it is sufficient to transmit "A" given that the server knows the combination of the player, that is to say, which cards are assigned to him and thus it is known to the server for each row of the matrix at which column the element assigned to the player is present. In greater detail, the gaming server knows the sequence of the Q elements, that is to say, it knows the Q pairs of values which identify the cards of the player even without effectively knowing which card is associated with each element. In the example of FIG. 12, the attempt of the player is to complete a suit of which he has 4/5. He is comforted by the very favourable probability because, in the row of the display where the exchange will take place, he can see four cards of the same suit. Therefore, he will have four probabilities in nine of succeeding (even the knowledge of this probability forms part of the transparency of the game). The frame, for example, initially yellow, of the card selected to be changed is replaced by a red frame (naturally, any other type of change of identification of the card is possible in the present invention) which is intended to identify the fact that the player has selected that card which belongs to his Q cards (and the Q cards are identified with a yellow frame within the matrix Ma(i,j)) in order to be replaced, that is to say, that card belongs to the P cards to be replaced. In the five cards in the vertical arrangement outside the display, the same card hidden and the same card missing from those illustrated in a fan-like manner is identified as a "discard" and marked as a card P to be changed.

Changing one or more of the Q cards by the player does not change the position of the elements inside the matrix Ma(i,j) or subgroup but only the display thereof. The changed elements will be, for example, bordered in red and the new elements in yellow as the non-changed elements. Furthermore, in order to remind the player of the situation preceding the change, the new combination of the game will be displayed near the old combination with the relevant numbers for the changed card of the same colours used to display the cards. They are instead really substituted in the personal cards displayed outside the matrix.

For transparency, still in respect of each player, there is also displayed on the monitor 20 of each piece of playing equipment 10a the exchange string s(i) which is obviously after the change itself. This allows each player to verify the correctness of the exchange carried out. The exchange string is displayed in accordance with the macrophase 6MF displayed in FIG. 7.

In the first step, given a row of the matrix Ma(i,j), the first column is selected (the column with j=0, step 6.1). There is then stored in k the index of the exchange column for the column j, that is to say, the column j corresponds to which additional column k (step 6.2), then the substitution j->k is shown (step 6.3) and then it is verified that the column j is at least the last column in the row (step 6.4). If so, the macrophase 6MF (step 6.6) is terminated but otherwise it continues (step 6.5) by moving to the subsequent column j=j+1 and repeating the passages from 6.2 to 6.4.

Therefore, the mapping carried out by the exchange string is displayed and, optionally in the case of different exchange strings for each row of the matrix, the macrophases 5 and 6MF are repeated for the total number of strings.

In order to display what has been set out, in FIG. 13 the equipment 10a of the player has received from the server the exchange string which is displayed in the grey frame at the bottom left (the two rows of numbers from 0 to 9 can be seen at the bottom left below the matrix); there is therefore the provision for a yellow frame around the new card which has been assigned to him (as then belonging to his Q cards) which in this case is the "0". To each element of each row of the matrix identified with the index 1 2 3 4 5 6 7 8 9 0, there is associated the value s(1) . . . s(0) given by 5 6 0 3 1 2 9 7 8 4.

In the first row, if it is desirable to change the card in position 3, the new card is located in position s(3)=0.

In the frame in the upper right region, the playing combination sets out the change by repeating the combination but displaying in red the numbers (positions in the vector) of the cards changed and the new ones in yellow. In fact, the player is playing with a new combination.

As may be seen, the arrangement of the cards in the matrix does not change and it is the set of frames which identifies the new card whilst it records the discarded card with a red frame.

The new card is preferably also positioned between the cards represented outside the matrix both in the vertical direction and in a fan-like manner.

In FIG. 14, the only difference with respect to FIG. 13 is that the player has actuated the button "Sort", thereby placing the cards illustrated in a fan-like manner in order of value and in those represented in a vertical manner near the display. In the case of those last ones, the rows of the display followed the order of the card. Suppose that the order of the rows is changed to AD EC B. That function could be actuated even before the change because it has no effect on the dynamics of the game and the change but is advantageous when reading at a glance the cards which are held.

In practice: the player receives the sequence of the elements Q with which the cards are associated (that is to say, which cards within the matrix are his), decides which cards to change and communicates them to the server which in turn transmits to him the sequence of the exchange string which is, as already mentioned, identical for all the players. All those communications server/client are in the form of strings of alphanumeric characters, for example, unidimensional or bidimensional arrays of whole numbers or letters. The server obviously knows that the player "Giovanni" is playing with the sequence of Q elements (A,3) (B,9) (C,6) (D,5) (E,1). The server knows which cards Giovanni has because the position of the cards is identical for everybody, given that the vector vetcar is transmitted in an identical state to all the players, and therefore knows to which cards the Q elements of each player correspond. When Giovanni communicates to the server his decision to change the cards, he says simply that he wishes to change some specific elements, for example, the first element and third element of the sequence, in this case (A,3) and (C,6). More preferably, the only data which the player Giovanni has to transmit by means of the equipment 10a to the server 10b are the "A" and the "C" (thus, in the specific case the element in row A and column 3 and the one in row C and column 6), the server receives the request from Giovanni and stores the data which indicate which elements Giovanni has changed so as to know with which new combination of elements he is playing and therefore, at the end of the game, so as to calculate the winner. At this point, the server transmits to Giovanni and to all the other players who have decided to modify their sequence of Q elements (thus, they have decided to change some of their cards) the exchange string which is identical for everyone. At that point, the software installed on the equipment 10a of Giovanni, after receiving the exchange string, displays the new cards together with those which have not been changed by carrying out the operation which the software of the example carries out autonomously in the macrophase 5MF. The control of the communication of the three sequences, that is to say, how the matrix is subdivided into subgroups, the card vector vetcar, what is the sequence of elements Q of the player and what is the exchange string, may be carried out in many manners, for example: the server can communicate to the gaming client both his sequence of elements and the exchange string at the start, but in that case the gaming program installed on the client equipment 10a will know not to reveal the exchange string before the correct time. The program in the equipment 10a could also calculate and therefore communicate the score achieved after the change of cards has been brought about by the player so as to eliminate another phase of data which have to be exchanged between the server and client. Naturally, the client would communicate the result only if the exchange had generated a winning score.

Once the replacement is carried out, the hand of poker is played in the usual manner in accordance with the speciality selected.

In addition to the above-described macrophases, the equipment 10a may include an optional initial macrophase (not illustrated) in which it is suggested that the player may select the game which he intends to play. For example, there may be provided a pull-down menu, from which a plurality of games may be selected. In fact, the equipment 10a and server 10b allow a plurality of games of cards to be played and not only the game of poker in the speciality form described above. Two games which can be implemented by means of the equipment/server 10a, 10b and the method of the invention are illustrated below.

5 Draw Poker

There is randomly assigned to the player a combination of 5 elements of the game matrix, one element for each row of the matrix. This combination, that is to say, the sequence of the five pairs in alphanumeric format, is indicated on the monitor in the upper right region. The cards of the vector vetcar are then associated with the matrix.

The player can select his game combination, that is to say, the sequence of the five pairs, by actuating before each hand of the game the button "Play" in the upper left region. Each time he presses the button, the combination will be changed randomly.

Once the combination is selected, he can actuate the button "Game" so as to see the cards (until this time, no card is visible in the game matrix, the one displayed on the monitor 20 is comparable with the one visible in the appended FIG. 8). His five cards will be displayed in the matrix and they will further appear in the right-hand column of the matrix, each in the region of the particular row, respectively.

The button "Game" is then replaced by the button "Shuffle" in order to again mix the cards and to start a new hand. The player can change up to 5 cards. In order to change the cards, it is simply necessary to select them with a click, then to actuate the button "Replace".

By actuating "Replace", the cards will be changed, the exchange string will appear in the bottom left region and the new combination which is the result of the card exchange will appear below the alphanumeric game combination at the upper right-hand region, with the colours which indicate the numbers relevant to the cards changed.

The cards to be changed are replaced with cards from the same particular row in accordance with the criterion of the exchange string which will be shown only after the selection of the cards to be changed has been carried out.

In order to know which combinations of maximum value are possible for that hand or to verify whether the cards which it would be desirable to obtain are arranged in the same rows as those which have been discarded, it is simply necessary to actuate the function "Show Top Scores" from the menu "Preferences".

With this function, the software will indicate in a suitable window the "Royal flush", "Straight flush" and "Pokers" possible and there will further appear three new buttons.

The button "Sort" serves to place in order of value our five cards which appear both in a column and, with that function, also in a fan-like manner.

The two buttons "Suit" and "Value" allow, if indicated above a card, an indication of either all the cards of the same suit or the cards of the same value so as to make seeking the desired cards faster, and the consequent verification of the possibility of obtaining them with the changes.

New Game

This new game, having the possible name "One or Two", is a game with community cards similar to Texas hold'em and Omaha.

This game is a new speciality of poker prepared accordingly for this gaming method and this specific dimension of matrix (5, 10) even if both Texas hold'em and Omaha can be carried out excellently with this same matrix.

In order to play One or Two, it is necessary to actuate from the menu Preferences the functions: "Show Top Scores"-"Cards one by one"-"Start with cards out of board"-"Play One or Two".

The functions Colour Set and Deck Style are selected so as to be personal to the player and they can be actuated for each game and serve to change the colours of the deck and the type of cards.

The buttons "Sort", "Suit" and "Value" have the same functions as in the preceding game.

Each player has seven cards available, five personal cards and two common cards, but in order to achieve his own point he will necessarily have to use at least one of the two common cards.

After actuating the four functions, the player may select his gaming combination simply with the "Play" button.

Once the combination is selected, two consecutive clicks on the button "Step" thereby make the two cards "Out of board" appear: those two cards are the common cards.

If the button "Step" continues to be clicked, the cards will begin to appear in the display from the first in position "(A,1)" to the last in position "(E,0)". In this exemplary software, viewing the cards by means of the "Step" button serves to simulate the rounds of bets of the various steps of the game. After viewing the common cards (Out of Board), the button "Step" is used to continue until the first three rows of cards are uncovered, which equate to the first three cards of the player. This is the "Flop" which, exactly as in Texas hold'em, is a betting step. Continuing with the fourth and fifth row involves the steps of "Turn" and "River".

All the cards being known, the player can change up to two cards of his five personal cards. In order to change two cards, he must discard one of the two common cards, selecting it with a click, whilst with the changing of a single card, he can use both the common cards. Once the selection has been carried out, he clicks the button "Replace" so as to proceed with the change of cards.

The invention claimed is:

1. A method for controlling a network of computing devices for managing a game of cards, said game being played with a plurality of cards R and each player possessing a specific number Q of cards per hand, the network including a server for controlling the game and at least one gaming device, the server and the gaming device being configured to communicate data between them, and each gaming device including a memory, at least one display device and at least one processor, the method comprising the steps of:

generating a first plurality of elements in a number equal to the plurality R of cards and subdividing said first plurality of elements into a second plurality of M subgroups, displaying on respective displays of said at least one gaming device the elements subdivided into said plurality of subgroups;

identifying each of the elements in each subgroup by at least one alphanumeric character;

selecting by the gaming device in a first selection phase an element for each one of said subgroups from a number N of alphanumeric characters forming a subgroup of the plurality of elements and sending to the server for each one of the selected elements the alphanumeric character identifying the selected element, or alternatively, generating by the server an alphanumeric character which determines an element in one of the subgroups and sending the alphanumeric character to the gaming device so as to select an element from a subgroup of the plurality of elements;

generating by the server a vector named vetcar having a dimension which is equal to or greater than the number of cards of the plurality R, wherein each value vetcar(i) of the vector is associated with a card of the plurality of cards R;

sending the vector vetcar from the server to all of the gaming devices present in the network;

associating with each element of the subgroups a card of the vector vetcar, in which the identity of a particular card is associated with the same element and is identified by the same alphanumeric character for each vector stored in memory on each gaming device;

assigning to the players in a playing hand the cards of the vector vetcar associated with the selected element in the first selection phase for each one of said subgroups as belonging to the cards Q in his possession;

generating by the server an exchange string comprising the number N of alphanumeric characters equal to the dimension of a subgroup M, arranging in a random manner the N alphanumeric characters in the exchange string so as to generate a vector of characters s(i) with i being from 0 to N−1;

associating the string with the subgroup so that a value of the exchange string corresponds to each element of a subgroup named sottogrup, such that an element s(t)=k is associated with each element t of sottogrup(t), and sottogrup(k) is an element of the subgroup; and sending said exchange string to each one of at least one gaming device.

2. The method according to claim 1, wherein the element selected in the first selection is selected randomly.

3. The method according to claim 1, wherein the step of selecting an element in a first selection for at least one subgroup comprises a step of selecting a plurality of elements equal to the number of subgroups, for each subgroup there being selected only one element, and the elements selected being associated with the cards Q which are in the possession of a player in a playing hand by the vector vetcar.

4. The method according to claim 1, further including the steps of:

selecting, for each player using a gaming device, from 0 to P elements in the subgroups, one element for each subgroup, with P being less than or equal to the number of cards assigned to each player Q, each of the P elements being associated with a card forming part of the Q cards which are in the possession of the player;

the card(s) selected forming part of the cards which the player wishes to change during a hand of the game;

removing the card(s) associated with the P elements from the cards Q belonging to the player;

identifying the subgroup of which each of the P elements associated with the cards to be changed forms part;

substituting each of those P elements to be changed by a new element selected from a second selection carried out within the same subgroup to which the element P belongs;

assigning to the player the new element selected from the second selection; and assigning the card associated with the new element selected from the second selection to the player so that the card forms part of the cards Q belonging to the player.

5. The method according to claim 4, wherein the second selection is carried out randomly.

6. The method according to claim 1, wherein vector vetcar(h) with h being an integer from 0 to R−1 comprises a succession of cards with a random sequence and the step of associating with those subgroups the cards of the vector vetcar includes the steps of:

subdividing the vector vetcar into a number m of subvectors equal to the number m of subgroups, each subvector having a dimension equal to the dimension of the subgroup associated with it, and, for each subgroup, associating with the first element of the subgroup the first card of the subvector of vetcar associated with the subgroup, the second card with the second element, until the last element of the subgroup with which the last card is associated, so that the m subgroups also identifiable as vectors $sottogrup_{i=1 \ldots m}(t$, with t being from 0 to n−1) where n is the dimension of the $m^{th}$ subgroup, are such that a card is associated with each element $sottogrup_i(t)$, and carrying out the first selection in a random manner by generating a random number $\tilde{t}$ with $\tilde{t}$ being an integer from 0 to n−1, so that the card selected in the first random selection is equal to $sottogrup_i(\tilde{t})$.

7. The method according to claim 4, including, in the step of substituting the element to be changed with a new element selected in a second selection, the substeps of:

selecting the element to be changed, the element being defined by the alphanumeric characters defining the subgroup to which sottogrup belongs, and the index $\tilde{t}$ for which the element $sottogrup(\tilde{t})$ is the card which the player wishes to change, and substituting the element of the same subgroup corresponding to $sottogrup(s(\tilde{t}))$, where s is the exchange string, for the element selected $sottogrup(\tilde{t})$ identified as being intended to be changed by the player.

8. The method according to claim 7, wherein each subgroup m of the plurality is associated with an exchange string s(i).

9. The method according to claim 7, wherein the exchange string is sent by the server to all the gaming device.

10. A program for computers, including a sequence of programming instructions which are capable, when loaded in a computer memory, of carrying out the steps of the method according to claim 1.

11. A product comprising a non-transitory medium readable by a computer, including instructions for computers which can be carried out by at least one processor in order to actuate the steps of the method according to claim 1.

* * * * *